United States Patent
Sakagami

(10) Patent No.: US 8,031,942 B2
(45) Date of Patent: Oct. 4, 2011

(54) MATCHING DEVICE

(75) Inventor: Koubun Sakagami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 597 days.

(21) Appl. No.: 12/206,129

(22) Filed: Sep. 8, 2008

(65) Prior Publication Data

US 2009/0077512 A1    Mar. 19, 2009

(30) Foreign Application Priority Data

Sep. 14, 2007  (JP) ................................ 2007-239238

(51) Int. Cl.
*G06K 9/00* (2006.01)

(52) U.S. Cl. ......... 382/181; 345/467; 382/317; 382/321

(58) Field of Classification Search .......... 382/100–102, 382/113, 181–231, 312, 317, 321; 715/255–263; 345/467–470
See application file for complete search history.

(56) References Cited

U.S. PATENT DOCUMENTS

| | | | | | |
|---|---|---|---|---|---|
| 3,290,651 | A | * | 12/1966 | Paufve et al. | 382/193 |
| 3,300,757 | A | * | 1/1967 | Beltz | 382/202 |
| 3,576,534 | A | * | 4/1971 | Steinberger | 382/221 |
| 3,651,459 | A | * | 3/1972 | Hahn | 382/231 |
| 4,355,302 | A | * | 10/1982 | Aldefeld et al. | 704/243 |
| 4,418,423 | A | * | 11/1983 | Tsuji et al. | 382/225 |
| 4,680,805 | A | * | 7/1987 | Scott | 382/197 |
| 4,811,412 | A | * | 3/1989 | Katsurada | 382/179 |
| 4,813,078 | A | * | 3/1989 | Fujiwara et al. | 382/185 |
| 4,864,628 | A | * | 9/1989 | Scott | 382/197 |
| 4,903,312 | A | * | 2/1990 | Sato | 382/170 |
| 5,034,991 | A | * | 7/1991 | Hagimae et al. | 382/209 |
| 5,655,129 | A | * | 8/1997 | Ito | 704/10 |
| 5,778,405 | A | * | 7/1998 | Ogawa | 715/259 |
| 2002/0028016 | A1 | * | 3/2002 | Gotoh | 382/181 |
| 2002/0126903 | A1 | * | 9/2002 | Takebe et al. | 382/229 |
| 2003/0059115 | A1 | * | 3/2003 | Nakagawa | 382/197 |
| 2003/0113016 | A1 | * | 6/2003 | Naoi et al. | 382/181 |

FOREIGN PATENT DOCUMENTS

| | | |
|---|---|---|
| JP | 3-116393 | 5/1991 |
| JP | 5-128311 | 5/1993 |
| JP | 9-179935 | 7/1997 |

OTHER PUBLICATIONS

DAPDNA-2 Architecture product description, IPFlex (and English translation thereof, available at http://www.ipflex.com/en/E1-products/dd2Arch.html), 2004.
DAPDNA-EB5 Evaluation Kit product description, IPFlex (and English translation thereof, available at http://www.ipflex.com/en/E1-products/eb5.html), 2004.

* cited by examiner

*Primary Examiner* — Manav Seth
(74) *Attorney, Agent, or Firm* — Cooper & Dunham LLP

(57) ABSTRACT

A matching device includes a first storing unit, a second storing unit, and a semiconductor device. The semiconductor device includes a control unit and a circuit unit. In the circuit unit, a first circuit including distance calculating circuits that calculate distances between unknown characters and dictionary characters and a selecting circuit that selects P distances having smallest values and character codes corresponding to the distances is configured, and then a second circuit including a permutation circuit that outputs distances in order from one having a smallest value and outputs character codes corresponding to the distances is configured.

10 Claims, 21 Drawing Sheets

MATCHING DEVICE

CROSS-REFERENCE TO RELATED APPLICATIONS

The present application claims priority to and incorporates by reference the entire contents of Japanese priority document 2007-239238 filed in Japan on Sep. 14, 2007.

BACKGROUND OF THE INVENTION

1. Field of the Invention

The present invention relates to a matching device for a character recognizing apparatus such as an optical character reader (OCR).

2. Description of the Related Art

Conventionally, character recognizing apparatuses such as an OCR perform matching of one optically-scanned character (an unknown character) and each of all characters registered in dictionary data (dictionary characters) and find characters having high degrees of similarity to thereby recognize the unknown character (see, for example, Japanese Patent Application Laid-open No. 9-179935 and Japanese Patent Application Laid-open No. 3-116393). In general, processing for this matching is performed by using a large scale integration (LSI). To increase speed of the processing for the matching, the dictionary data is dividedly stored in a plurality of memories and distributed processing is performed in the LSI. In recent years, according to the progress in the semiconductor technology, memory access speed has been increased and a size of a circuit that can be incorporated in the LSI has been increased. Therefore, a character recognizing apparatus including a matching device that can perform matching of a plurality of unknown characters at higher speed using parallel processing is developed (see, for example, Japanese Patent Application Laid-open No. 5-128311).

However, in the technology disclosed in Japanese Patent Application Laid-open No. 5-128311, even if the matching can be performed at higher speed by the parallel processing, if the size of the circuit incorporated in the LSI is large, cost increases. Therefore, there is a demand for a reduction in size of a circuit of the LSI in the matching device that performs the matching for character recognition using the parallel processing.

SUMMARY OF THE INVENTION

It is an object of the present invention to at least partially solve the problems in the conventional technology.

According to one aspect of the present invention, there is provided a matching device that selects, in character recognition, using a characteristic amount of a first character as a recognition object and characteristic amounts of a plurality of second characters registered in a dictionary in advance, P second characters similar to the first character among the second characters as recognition candidates, where P is an integer equal to or larger than two. The matching device includes a first storing unit that stores a plurality of first characteristic amount data indicating the characteristic amount of the first character and a plurality of dictionary data including second characteristic amount data indicating the characteristic amounts of the second characters and character codes of the second characters; a semiconductor device including a circuit unit in which a circuit is rewritably configured and a second circuit is configured after a first circuit is configured and a control unit that controls rewriting of the circuit configured in the circuit unit; and a second storing unit that stores first circuit configuration data for configuring the first circuit in the circuit unit and second circuit configuration data for configuring the second circuit in the circuit unit. The first circuit includes k first memories that are respectively input with k first characteristic amount data among the first characteristic amount data stored in the first storing unit, where k is an integer equal to or larger than two, a character code memory that is input with the character codes included in L dictionary data among the dictionary data stored in the first storing unit, where L is an integer equal to or larger than two, a second memory that is input with the second characteristic amount data included in the L dictionary data among the dictionary data stored in the first storing unit, k distance calculating units that are input with the first characteristic amount data input to one of the first memories and the second characteristic amount data input to the second memory and calculate, for each of the second characters, a distance between the first character and the second character using the first characteristic amount data and the second characteristic amount data, the distance calculating units being capable of operating in parallel to one another, k selecting units that are input with the character codes corresponding to the second characteristic amount data used by one of the distance calculating units for the calculation of a plurality of the distances from the character code memory and are input with the distances calculated by one of the distance calculating units and select P first distances with a smallest value among the distances and first character codes corresponding to the respective first distances, the selecting units being capable of operating in parallel to one another, and k third memories that are respectively input with the P first distances and the first character codes selected by one of the selecting units and store the first distances and the first character codes. The second circuit includes the k third memories, and k permutation units that are input with the L first distances and the first character codes stored in one of the third memories and output the first distances in order from one having a smallest value and output the first character codes corresponding to the first distances, the permutation units being capable of operating in parallel to one another. The control unit reads out the first circuit configuration data stored in the second storing unit and configures the first circuit in the circuit unit and, then, when the P first distances and the first character codes are respectively input to the k third memories of the first circuit, reads out the second circuit configuration data stored in the second storing unit and rewrites the circuit configured in the circuit unit to the second circuit while keeping the P first distances and the first character codes in the k third memories, respectively.

Furthermore, according to another aspect of the present invention, there is provided a matching device that selects, in character recognition, using a characteristic amount of a first character as a recognition object and characteristic amounts of a plurality of second characters registered in a dictionary in advance, P second characters similar to the first character among the second characters as recognition candidates, where P is an integer equal to or larger than two. The matching device includes a first storing unit that stores a plurality of first characteristic amount data indicating the characteristic amount of the first character and a plurality of dictionary data including second characteristic amount data indicating the characteristic amounts of the second characters and character codes of the second characters; a semiconductor device including a circuit unit in which a circuit is rewritably configured and a second circuit is configured after a first circuit is configured and a control unit that controls rewriting of the circuit configured in the circuit unit; and a second storing unit that stores first circuit configuration data for configuring the first circuit in the circuit unit and second circuit configuration data for configuring the second circuit in the circuit unit. The first circuit includes k first memories that are respectively input with k first characteristic amount data among the first characteristic amount data stored in the first storing unit where k is an integer equal to or larger than two, a character code memory that is input with the character codes included in L dictionary data among the dictionary data stored in the first storing unit, where L is an integer equal to or larger than two, a second memory that is input with the second characteristic amount data included in the L dictionary data among the dictionary data stored in the first storing unit, k distance calculating units that are input with the first characteristic amount data input to one of the first memories and the second characteristic amount data input to the second memory and calculate, for each of the second characters, a distance between the first character and the second character using the first characteristic amount data and the second characteristic amount data, the distance calculating units being capable of operating in parallel to one another, k selecting units that are input with the character codes corresponding to the second characteristic amount data used by one of the distance calculating units for the calculation of a plurality of the distances from the character code memory and are input with the distances calculated by one of the distance calculating units and select P first distances with a smallest value among the distances and first character codes corresponding to the respective first distances, the selecting units being capable of operating in parallel to one another, and a third memory that is input with the P first distances and the first character codes selected by the k selecting units in order and stores k sets of the P first distances and the first character codes. The second circuit includes the k third memory, and a permutation unit that is input with the k sets of the P first distances and the first character codes stored in the third memory and outputs, for each of the sets, the first distances in order from one having a smallest value and outputs the first character codes corresponding to the first distances. The control unit reads out the first circuit configuration data stored in the second storing unit and configures the first circuit in the circuit unit and, then, when the k sets of the P first distances and the first character codes are input to the third memory of the first circuit, reads out the second circuit configuration data stored in the second storing unit and rewrites the circuit configured in the circuit unit to the second circuit while keeping the k sets of the P first distances and the first character codes in the third memory.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
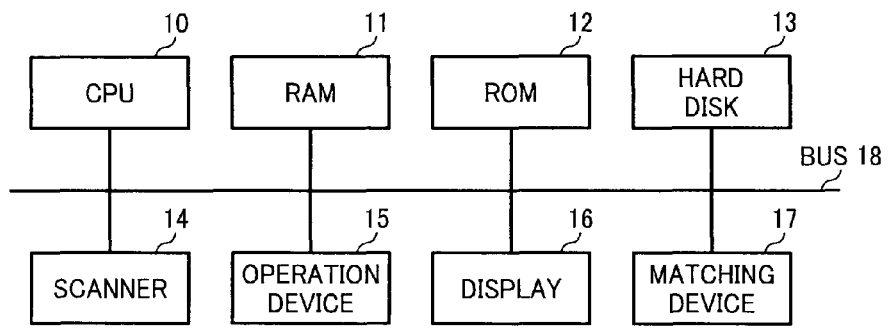
FIG. 1 is a diagram of a configuration of a character recognizing apparatus according to a first embodiment of the present invention.

FIG. 1 is a diagram of a configuration of a character recognizing apparatus having a matching device according to a first embodiment of the present invention. In the figure, a character recognizing apparatus 1 includes a central processing unit (CPU) 10, a random access memory (RAM) 11, a read only memory (ROM) 12, a hard disk 13, a scanner 14, an operation device 15, a display 16, and a matching device 17. These devices are connected via a bus 18. The scanner 14 optically scans an image and converts the image into image data. The operation device 15 receives an operation input from a user. The display 16 displays, for example, result of character recognition processing. The CPU 10 executes various programs stored in the ROM 12 and the hard disk 13 to thereby control the entire apparatus. The ROM 12 and the hard disk 13 store various programs and various data. The RAM 11 temporarily stores various programs and various data when the CPU 10 executes the various programs The character recognition processing performed by the character recognizing apparatus 1 having such a configuration includes (a) processing for discriminating vertical and horizontal directions of an image scanned by the scanner 14, (b) processing for extracting an image for one character, (c) processing for extracting a characteristic amount of a character, (d) matching processing, and (e) processing for determining one candidate out of a plurality of recognition candidates obtained as a result of the matching processing. Among these kinds of processing, after the CPU 10 performs the processing of (a) to (c), the matching device 17 performs the matching processing of (d). The CPU 10 acquires a result of the matching processing and performs the processing of (e).

Figure 2:
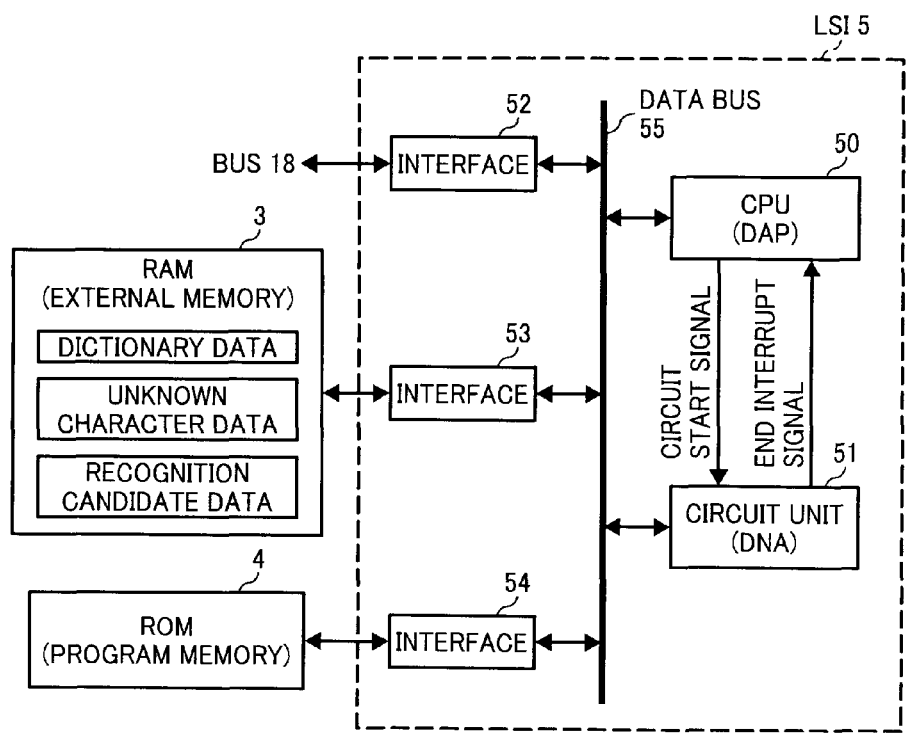
FIG. 2 is a diagram of a configuration of a matching device 17 according to the embodiment.

FIG. 2 is a diagram of a configuration of the matching device 17 that performs the matching processing. The matching device 17 includes a large-scale integration (LSI) 5, a RAM 3, and a ROM 4. The ROM 4 stores program data used in the LSI 5. The RAM 3 stores dictionary data, unknown character data, and recognition candidate data obtained as a result of the matching processing. Details of these data are described later.

The LSI 5 is a semiconductor device that can rewrite a circuit. The LSI 5 is configured by using, for example, DAP-DNA-2 (registered trademark) realized by a dynamic reconfigurable technology. A configuration of the DAPDNA-2 is described in, for example, reference literature (Design Wave Magazine, August 2004, pp. 30 to 35, Chapter 2: Device Architecture of DAPDNA (CQ Publishing Co., Ltd.)). In the LSI 5, as shown in FIG. 2, a CPU 50 called a digital application processor (DAP), a circuit unit 51 that is called distributed network architecture (DNA) and in which a rewritable circuit is configured, and interfaces 52 to 54 are connected to a data bus 55. The interface 52 controls data communication between the bus 18 and the CPU 50. The interface 53 controls data communication between the RAM 3 and the CPU 50. The CPU 50 reads out the dictionary data and the unknown character data stored in the RAM 3 via the data bus 55 and the interface 53 and writes recognition candidate data obtained as a result of the matching processing in the RAM 3. The interface 54 controls data communication between the ROM 4 and the CPU 50. The CPU 50 reads out the program data stored in the ROM 4 via the data bus 55 and the interface 54. The program data includes programs executed by the CPU 50 and configuration data for defining one circuit configuration. The CPU 50 executes the programs included in the program data stored in the ROM 4 to thereby function as a reduced instruction set computer (RISC) that mainly performs sequential processing.

The circuit unit 51 has a two-dimensional array structure and mainly performs large-scale data processing and arithmetic processing. The CPU 50 dynamically switches a circuit configuration of the circuit unit 51. The circuit configured by the circuit unit 51 is defined by configuration data. Specifically, connection of operators arranged in a two-dimensional shape and operations of the operators are set by the configuration data. When the configuration data is used, the configuration data is read out from the ROM 4 to the RAM 3 by the CPU 50. The circuit unit 51 has a not-shown configuration memory. The configuration memory includes three background bank and an execution bank. The configuration data read out from the RAM can be transferred to any one of the banks. When the configuration data is transferred to the execution bank, a circuit is configured in the circuit unit 51. In other words, the circuit configuration of the circuit unit 51 can be changed by transferring the configuration data from the background bank to the execution bank. This means that the circuit can be rewritten. The transfer of the configuration data from the background bank to the execution bank can be performed in one clock. The circuit unit 51 has an operator incorporating a RAM (not shown) and can use the RAM as an internal memory. Data stored in the internal memory is maintained even if the circuit is rewritten. A specific configuration of the circuit configured in the circuit unit 51 is described later.

Figure 3:
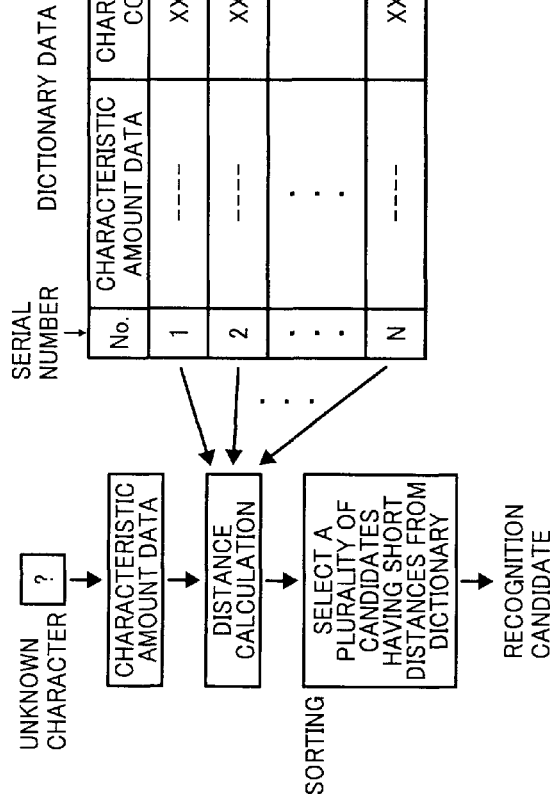
FIG. 3 is a diagram for explaining an overview of matching processing in character recognition processing.

FIG. 3 is a diagram of an overview of the matching processing in the character recognition processing performed in the character recognizing apparatus 1. The matching processing in the character recognition processing is processing for calculating, using a characteristic amount of one unknown character, an image of which is scanned by a scanner, and a characteristic amount of characters registered in a dictionary (dictionary characters), a distance between each of the dictionary characters and the unknown character and selecting a plurality of dictionary characters with small distances as recognition candidates for the unknown character. Characteristic amount data indicating a characteristic amount of each of the dictionary characters and a character code are associated with the dictionary characters in advance. This is equivalent to the dictionary data described above. As shown in the figure, serial numbers ("1", "2", . . . , "N") are associated with the dictionary data. Characteristic amount data indicating a characteristic amount of the unknown character is associated with the unknown character. This is equivalent to the unknown character data described above. A distance between the dictionary characters and the unknown character is calculated by using the characteristic amount data associated with the respective characters. Character codes of the dictionary characters selected as the recognition candidates and distances between the dictionary characters and the unknown character are output as recognition candidate data.

Figure 4:
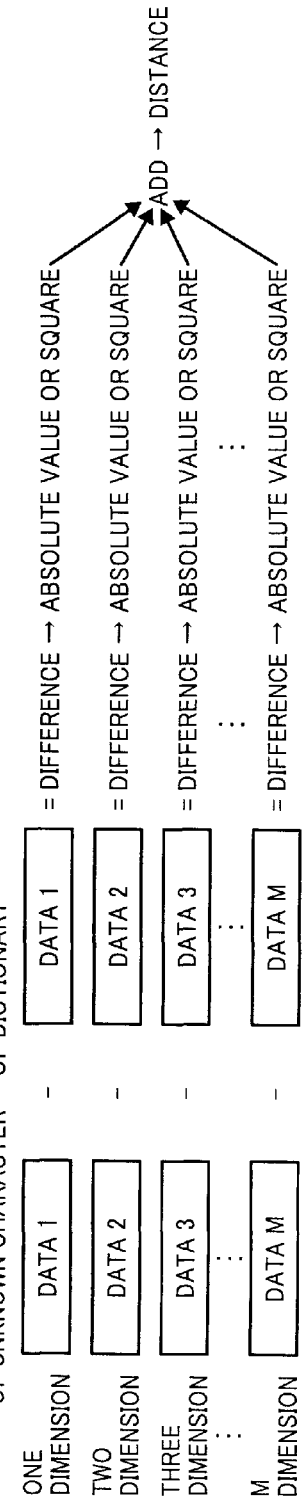
FIG. 4 is a diagram for explaining a method of calculating a distance between a dictionary character and an unknown character.

FIG. 4 is a diagram for explaining a method of calculating a distance between a dictionary character and an unknown character. Characteristic amount data indicating a characteristic amount of one character is M-dimensional vector data including M (M is an integer equal to or larger than 2) values. A difference in values in each of identical dimensions between characteristic amount data of one character of the dictionary and characteristic amount data of one character of unknown characters is calculated and an absolute value or a square of the difference is calculated. A value obtained by adding up absolute values or squares for all the dimensions is a distance between the one character of the dictionary and the one character of the unknown characters. To calculate distances between one character of the unknown characters and all characters registered in the dictionary (e.g., about 4000 characters as printing types of Japanese language), the subtraction is performed M times, the calculation of an absolute value or the calculation of a square is performed M times, and the cumulative addition is performed M times for one character of the dictionary. The series of processing is repeated by the number of characters registered in the dictionary (e.g., 4000 times). In this way, the arithmetic operations are performed an extremely large number of times in the matching processing in the character recognition processing.

Figure 5:
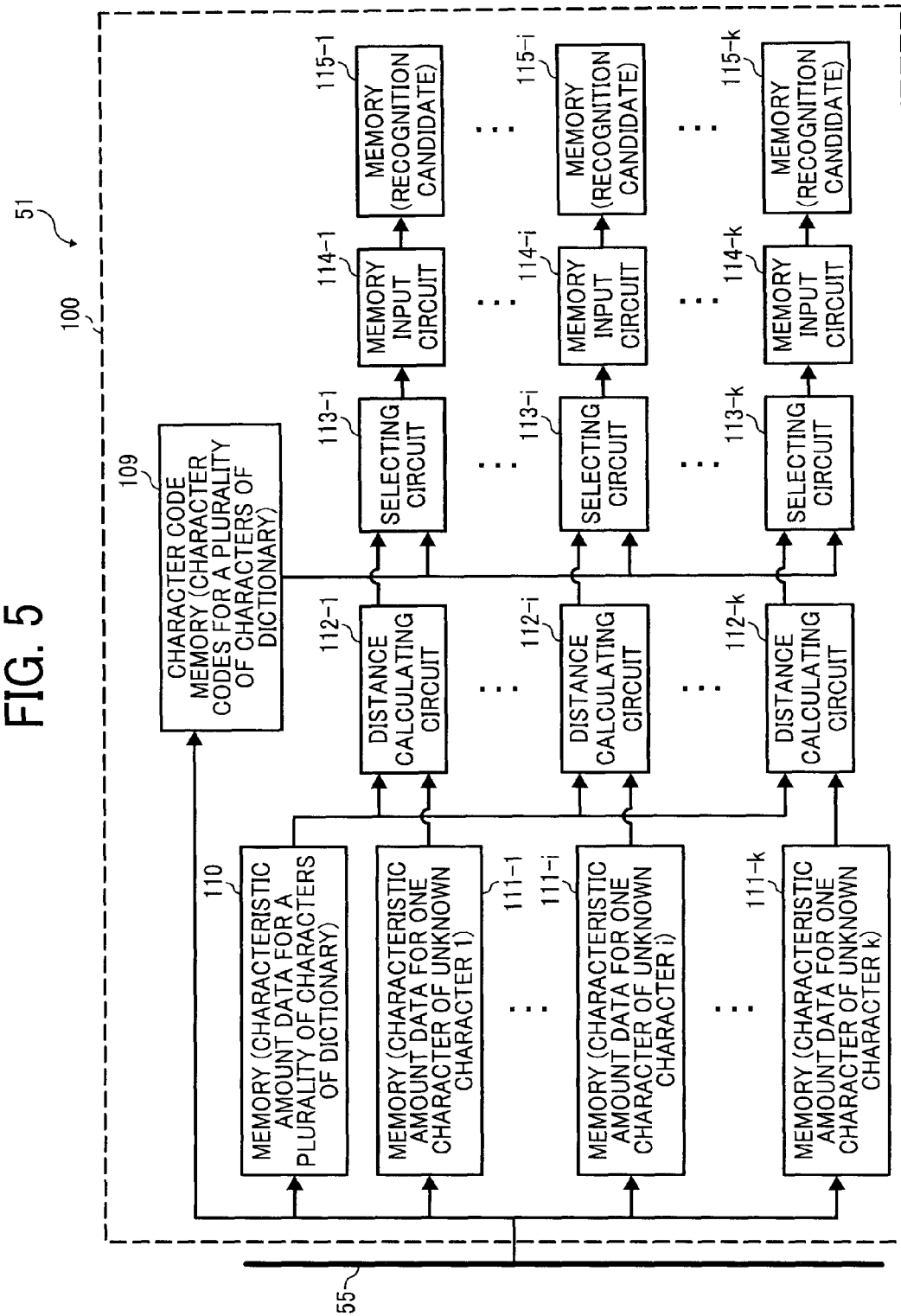
FIG. 5 is a diagram of a circuit configuration written in a circuit unit 51 of an LSI 5.
Figure 6:
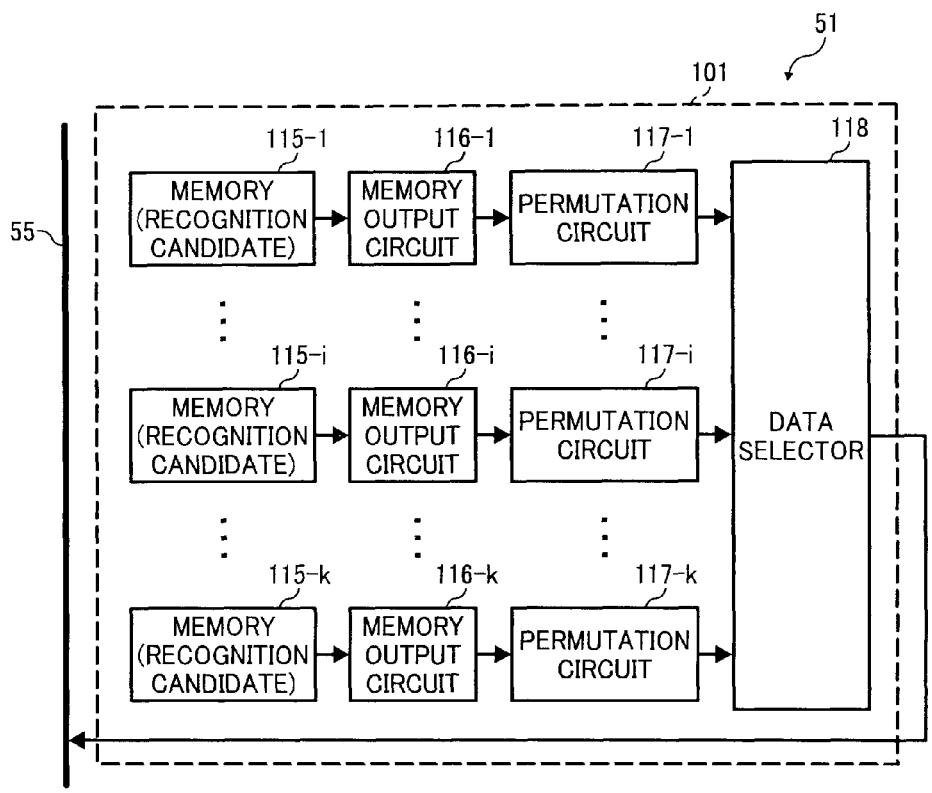
FIG. 6 is a diagram of a circuit configuration written in the circuit unit 51 of the LSI 5.

FIGS. 5 and 6 are diagrams of a circuit configuration written in the circuit unit (DNA) 51 of the LSI 5. Circuits 100 and 101 shown in the figures are written in the circuit unit 51 and configured at predetermined timing, matching processing for k (k is an integer equal to or larger than 2) unknown characters can be simultaneously performed in parallel. In the figures, the other components of the LSI 5 shown in FIG. 2 are not shown. In FIG. 5, the circuit 100 includes a character code memory 109, a memory 110, k memories 111-1 to 111-$k$, k distance calculating circuits 112-1 to 112-$k$, k selecting circuits 113-1 to 113-$k$, k memory input circuits 114-1 to 114-$k$, and k memories 115-1 to 115-$k$. The character codes included in the dictionary data stored in the RAM 3 are input to the character code memory 109. Here, among the dictionary data for all the dictionary characters stored in the RAM 3, character codes included in dictionary data for L (L is an integer equal to or larger than 2) dictionary characters are input. The characteristic amount data included in the dictionary data stored in the RAM 3 is input to the memory 110. Here, characteristic amount data included in the dictionary data for the L dictionary characters is input. The memory 110 outputs the characteristic amount data for one dictionary character to each of the k distance calculating circuits 112-1 to 112-$k$. The characteristic amount data stored in the RAM 3 is input to the memories 111-$i$ (i=1 to k) as unknown character data for unknown characters i for each of the characters. The memories 111-$i$ output the characteristic amount data for the unknown characters to the distance calculating circuits 112-$i$, respectively.

The characteristic amount data for one dictionary character output from the memory 110 and the characteristic amount data for one unknown character output from the memories 111-$i$ are input to the distance calculating circuits 112-$i$. The distance calculating circuits 112-$i$ calculate distances between the dictionary characters and the unknown characters using the characteristic amount data. The selecting circuits 113-$i$ select P (P is an integer equal to or larger than 2; e.g., 10) having a smallest value among the distances calculated by the distance calculating circuits 112-$i$ and character codes included in the dictionary data, the characteristic amount data of which is used for the calculation of the distances. The memory input circuits 114-$i$ store the ten distances and the ten character codes selected by the selecting circuits 113-$i$. The memory input circuits 114-$i$ input the ten distances in random order selected by the selecting circuits 113-$i$ and the ten character codes corresponding to the distances to the memories 115-$i$ as recognition candidate data in random order.

In FIG. 6, the circuit 101 is a circuit following the circuit 100. The circuit 101 includes k memories 115-1 to 115-$k$, k memory output circuits 116-1 to 116-$k$, k permutation circuits 117-1 to 117-$k$, and a data selector 118. The memories 115-$i$ are the memories 115-$i$ in the circuit 100 shown in FIG. 5, and store the recognition candidate data input in the circuit 100. The memory output circuits 116-$i$ output the recognition candidate data stored in the memories 115-$i$ to the permutation circuits 117-$i$. The permutation circuits 117-$i$ perform permutation using the ten distances and the ten character codes output from the memory output circuits 116-$i$ as the recognition candidate data. The permutation circuits 117-$i$ output the distances and the character codes corresponding to the distances as the recognition candidate data in order from one having a smallest value. The data selector 118 outputs, in order, the recognition candidate data output from the permutation circuits 117-$i$. Consequently, the recognition candidate data output from the permutation circuits 117-$i$ in random order can be output in order from one having a smallest value of a distance. The CPU 50 writes the recognition candidate data output by the data selector 118 in the RAM 3 via the data bus 55 and the interface 53 shown in FIG. 2. With the configuration described above, the matching processing for the k unknown characters is performed in parallel. As a result, ten recognition candidate data are stored in the RAM 3 for each of the unknown characters.

Figure 7:
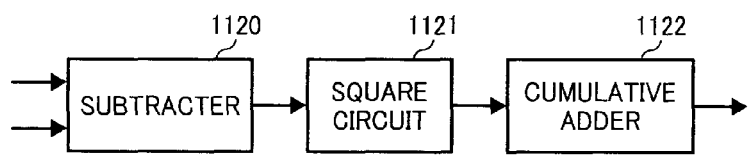
FIG. 7 is a diagram of a configuration of a distance calculating circuit 112.

FIG. 7 is a diagram of a configuration of the distance calculating circuit 112. Because configurations of all the distance calculating circuits 112-1 to 112-$k$ are the same, when it is unnecessary to distinguish the distance calculating circuits, the distance calculating circuits are simply referred to as distance calculating circuit 112. The distance calculating circuit 112 is configured by a pipeline circuit in which a subtracter 1120, a square circuit 1121, and a cumulative adder 1122 are cascaded. The subtracter 1120 has two input terminals. When characteristic amount data for one dictionary character and characteristic amount data for one unknown character are simultaneously input to the input terminals, the subtracter 1120 outputs a difference between the characteristic amount data. The square circuit 1121 squares the difference output by the subtracter 1120 and outputs a squared value. The cumulative adder 1122 adds up M squared values output by the square circuit 1121 and outputs a distance between the one dictionary character and the one unknown character. When the input of M characteristic amount data from the two input terminals of the subtracter 1120 is finished, the distance calculating circuit 112 outputs the distance after a predetermined internal delay.

Figure 8:
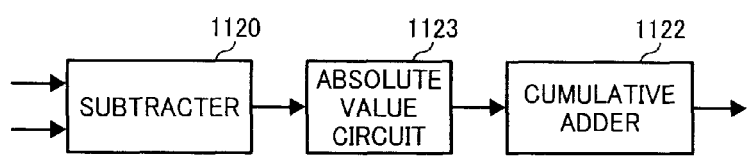
FIG. 8 is a diagram of another example of the configuration of the distance measuring circuit 112.

FIG. 8 is a diagram of another example of the configuration of the distance calculating circuit 112. In this example, the square circuit 1121 shown in FIG. 7 is replaced with an absolute value circuit 1123. When an input value is negative, the absolute value circuit 1123 changes the negative input value to a positive value and outputs the positive value. For example, when an input value is "−5", the absolute value circuit 1123 outputs "+5". Otherwise, the configuration of the distance calculating circuit 112 is the same as that shown in FIG. 7.

Figure 9:
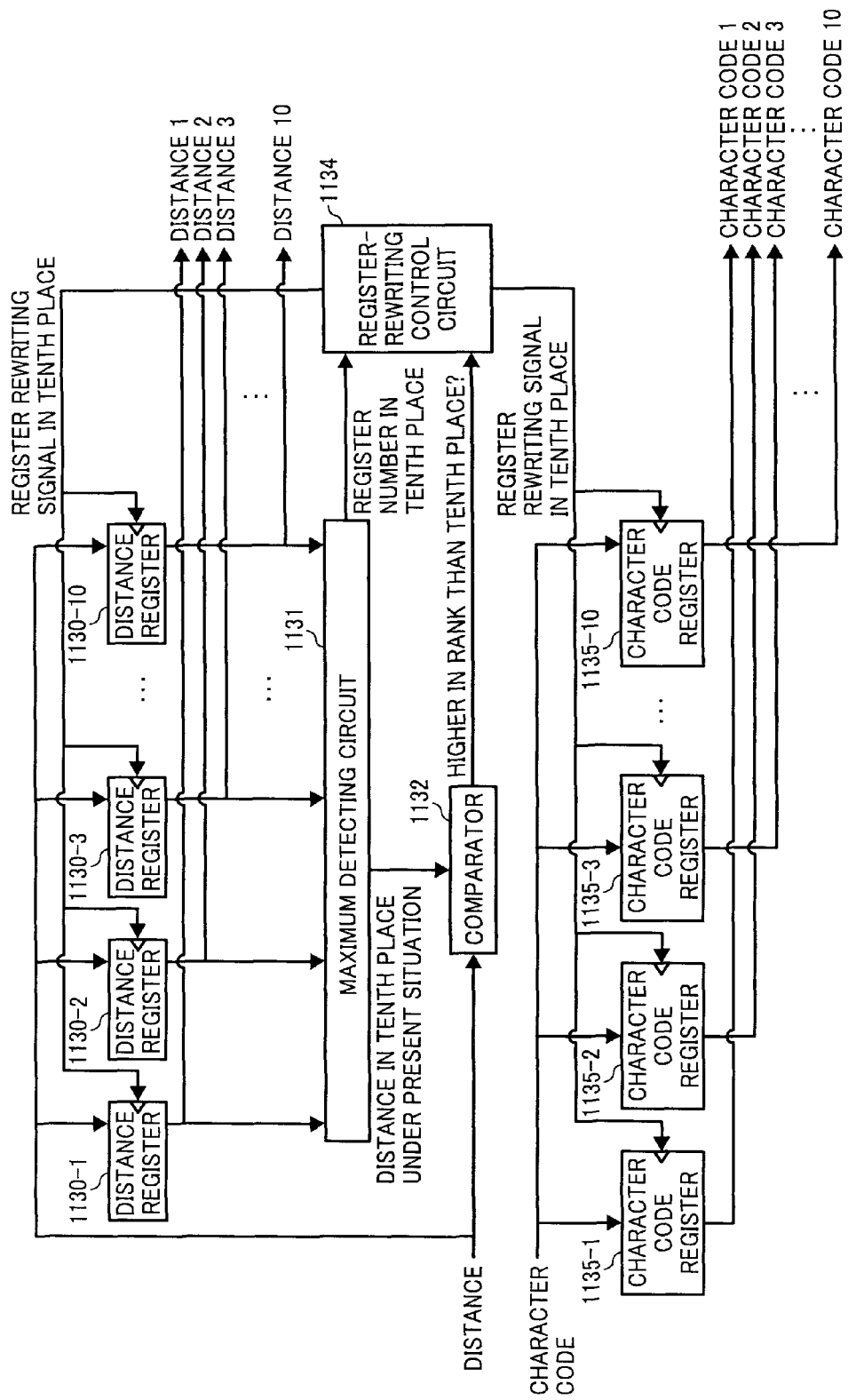
FIG. 9 is a block diagram of a selecting circuit 113.

FIG. 9 is a block diagram of the selecting circuit 113. Because configurations of all the selecting circuits 113-1 to 113-$k$ are the same, when it is unnecessary to distinguish the selecting circuits, the selecting circuits are simply referred to as selecting circuit 113. The distance output by the distance calculating circuit 112 and the character code output by the character code memory 109 are input to the selecting circuit 113. The selecting circuit 113 includes distance registers 1130-1 to 1130-10, character code registers 1135-1 to 1135-10, a maximum detecting circuit 1131, a comparator 1132, and a register-rewriting control circuit 1134. The distance registers 1130-1 to 1130-10 store ten distances, respectively. The character code registers 1135-1 to 1135-10 respectively store ten character codes corresponding the distances stored in the distance registers 1130-1 to 1130-10. The maximum detecting circuit 1131 outputs a maximum among the ten distances (a distance in the tenth place under the present situation) and a register number of a distance register that stores the distance. For convenience of explanation, it is assumed that register numbers of the distance registers 1130-1 to 1130-10 are "1" to "10", respectively. Similarly, it is assumed that register numbers of the character code registers 1135-1 to 1135-10 are "1" to "10", respectively.

The comparator 1132 compares the maximum (the distance in the tenth place under the present situation) output by the maximum detecting circuit 1131 and a distance input anew from any one of the distance registers 1130-1 to 1130-10. The comparator 1132 outputs a signal indicating whether the distance input anew is smaller than the maximum, i.e., the distance is higher in a rank than the tenth place. The register number of the distance register that stores the distance in the tenth place output by the maximum detecting circuit 1131 is input to the register-rewriting control circuit 1134. The register-rewriting control circuit 1134 outputs a signal for rewriting the register number of the distance register that stores the distance in the tenth place and a signal for rewriting a register number of a character code register corresponding to the distance. The ten distances as the recognition candidates and the character codes corresponding thereto are stored in the distance registers and the character code registers, respectively, and all values thereof are simultaneously output. The maximum detecting circuit 1131 always outputs a maximum of the distances, i.e., a distance in the tenth place under the present situation and a register number of a distance register that stores the distance. The distances are stored in the ten distance registers 1130-1 to 1130-10 in random order. In other words, the distances are not stored in the distance registers 1130-1 to 1130-10 in order from one having a smallest value. Processing for rearranging the distances from the smallest one is performed by the permutation circuits 117-i. Details of a configuration of the permutation circuits 117-i are described later.

Figure 10:
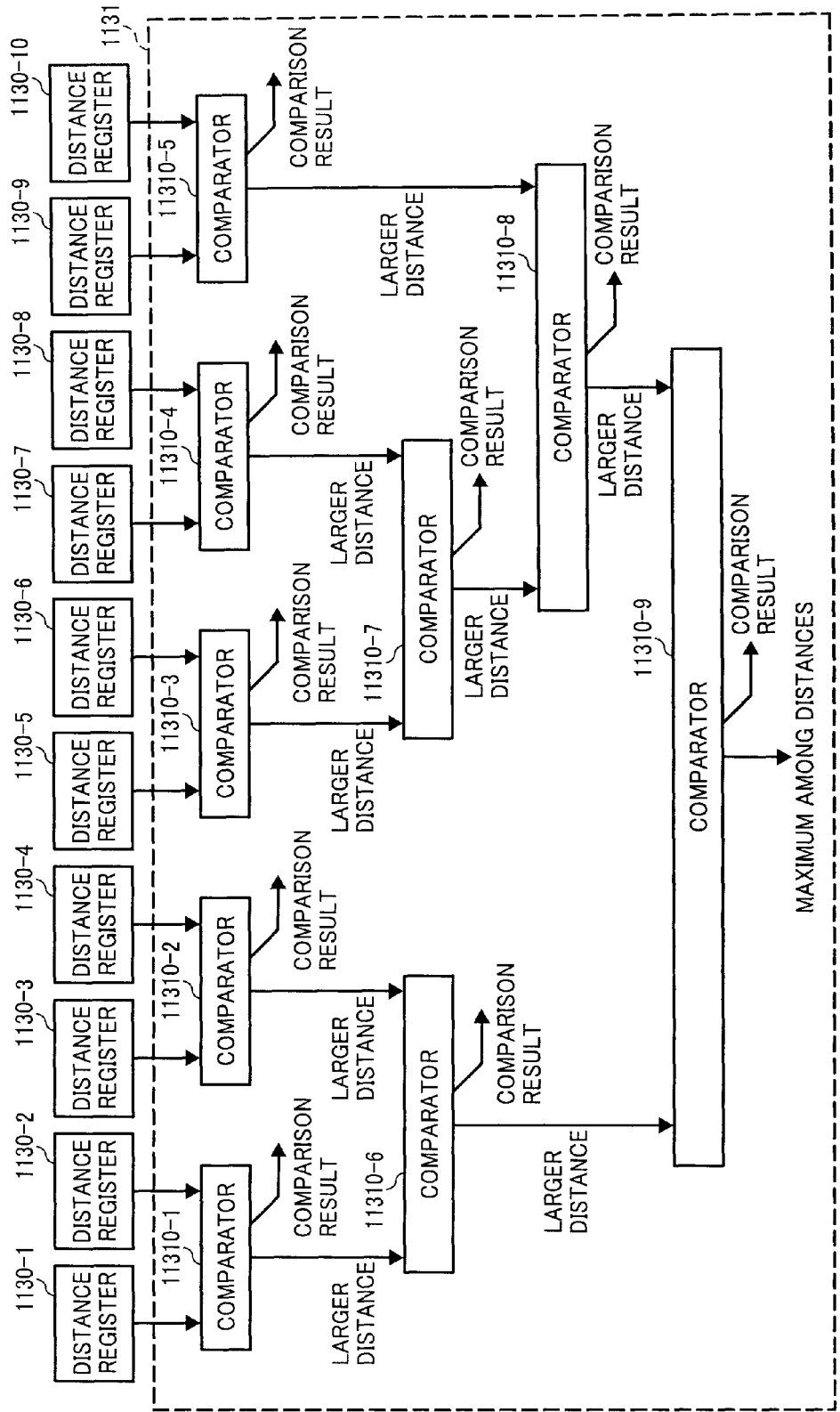
FIG. 10 is a block diagram of a maximum detecting circuit 1131.
Figure 11:
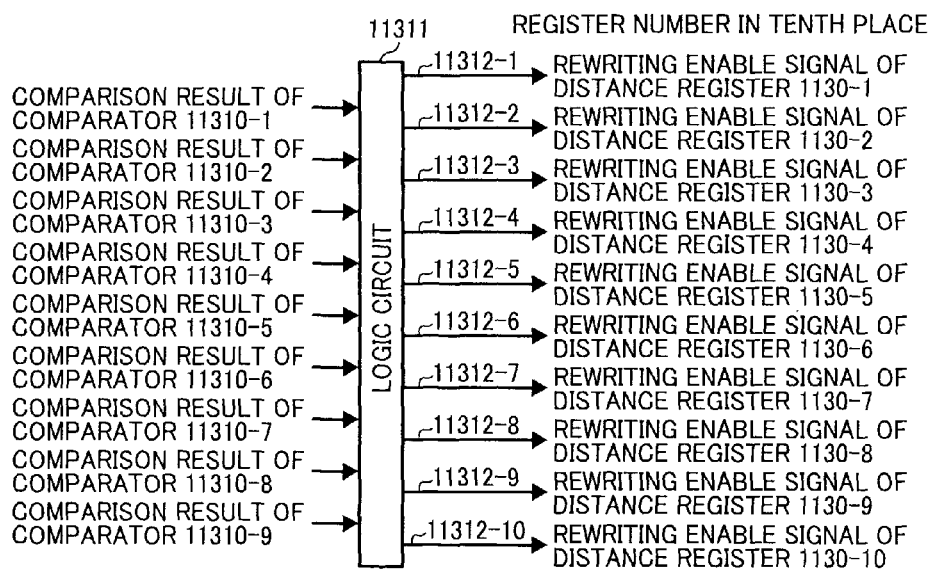
FIG. 11 is a block diagram of the maximum detecting circuit 1131.

FIGS. 10 and 11 are block diagrams of the maximum detecting circuit 1131. The maximum detecting circuit 1131 includes comparators 11310-1 to 11310-9 shown in FIG. 10 and a logic circuit 11311 shown in FIG. 11. The comparators 11310-1 to 11310-5 compare distances stored in two distance registers among the distance registers 1130-1 to 1130-10 and output a larger one of the distances. The comparators 11310-6 to 11310-9 compare larger distances output by two comparators among the comparators 11310-1 to 11310-5 and output a larger one of the distances. In this way, the maximum detecting circuit 1131 outputs a maximum among distances according to a comparison system like that used in a tournament of sports. The comparators 11310-1 to 11310-9 output 1-bit data signals indicating comparison results.

The data signals indicating the comparison results output from the comparators 11310-1 to 11310-9 are input to the logic circuit 11311. The logic circuit 11311 output a register number of a distance register that stores the maximum among the distances through data lines 11312-1 to 11312-10. The comparison results of the comparators 11310-1 to 11310-9 are as described below.

The comparison result of the comparator 11310-1 is "1" when a distance stored in the distance register 1130-1 is larger than a distance stored in the distance register 1130-2. Otherwise, the comparison result is "0". When the distance stored in the distance register 1130-1 and the distance stored in the distance register 1130-2 are the same, the comparison result of the comparator 11310-1 is "0". This result is the same as the result obtained when the distance stored in the distance register 1130-1 is smaller than the distance stored in the distance register 1130-2. Therefore, the comparator 11310-1 shown in FIG. 10 detects the distance stored in the distance register 1130-2 as a larger distance.

The comparison result of the comparator 11310-2 is "1" when a distance stored in the distance register 1130-3 is larger than a distance stored in the distance register 1130-4. Otherwise, the comparison result is "0". The comparison result of the comparator 11310-3 is "1" when a distance stored in the distance register 1130-5 is larger than a distance stored in the distance register 1130-6. Otherwise, the comparison result is "0". The comparison result of the comparator 11310-4 is "1" when a distance stored in the distance register 1130-7 is larger than a distance stored in the distance register 1130-8. Otherwise, the comparison result is "0". The comparison result of the comparator 11310-5 is "1" when a distance stored in the distance register 1130-9 is larger than a distance stored in the distance register 1130-10. Otherwise, the comparison result is "0".

The comparison result of the comparator 11310-6 is "1" when the comparison result of the comparator 11310-1 is larger than the comparator result of the comparator 11310-2. Otherwise, the comparison result is "0". The comparison result of the comparator 11310-7 is "1" when the comparison result of the comparator 11310-3 is larger than the comparison result of the comparator 11310-4. Otherwise, the comparison result is "0". The comparison result of the comparator 11310-8 is "1" when the comparison result of the comparator 11310-7 is larger than the comparison result of the comparator 11310-5. Otherwise, the comparison result is "0". The comparison result of the comparator 11310-9 is "1" when the comparison result of the comparator 11310-6 is larger than the comparison result of the comparator 11310-8. Otherwise, the comparison result is "0", A register number of a distance register that stores the maximum among the distances can be determined from a combination of values "1" and "0" of these nine comparison results. The data lines 11312-1 to 11312-10 correspond to the register numbers "1" to "10", respectively. The determined register number is output by an enable signal via a data line corresponding thereto. For example, when the determined register number is "5", an enable signal "1" is output via the data line 11312-5. An enable signal "0" is output from the other nine data lines 11312-1 to 11312-4 and 11312-6 to 11312-10. In other words, a register number corresponding to a data line from which the enable signal "1" is output is the register number of the distance register that stores the distance in the tenth place.

A table that stores values of the respective enable signals can be created in the ROM 4 instead of the logic circuit 11311.

Referring back to FIG. 9, the comparator 1132 compares the distance input from the distance calculating circuit 112 to the selecting circuit 113 and the maximum among the distances output by the maximum detecting circuit 1131.

The comparator 1132 outputs a signal indicating whether the former is smaller, i.e., the distance input to the selecting circuit 113 is higher in a rank than the tenth place. When the signal output from the comparator 1132 indicates that the distance input to the selecting circuit 113 is higher in a rank than the tenth place, the register-rewriting control circuit 1134 rewrites a value of the distance stored in the distance register corresponding to the register number output from the maximum detecting circuit 1131 to a value of the distance input to the selecting circuit 113. In other words, the distance of the distance register that stores the distance in the tenth place is rewritten to the distance input to the selecting circuit 113. This distance is a new distance in the tenth place. The register-rewriting control circuit 1134 rewrites a value of a character code register corresponding to the register number output from the maximum detecting circuit 1131 to the character code input to the selecting circuit 113. In other words, a character code corresponding to a dictionary character as a basis of the calculation of the distance in the tenth place is written to a character code corresponding to a dictionary character as a basis of the calculation of the new distance in the tenth place. When the distance input to the selecting circuit 113 is larger than the maximum among the distances output by the maximum detecting circuit 1131, i.e., when the signal output from the comparator 1132 does not indicate that the distance input to the selecting circuit 113 is higher in a rank than the tenth place, this means that the distance is in the eleventh place or lower in a rank than the eleventh place. Therefore, the register-rewriting control circuit 1134 does not rewrite the distance register and the character code register. Maximums that can be taken as values of distances are set in initial values of the distance registers 1130-1 to 1130-10.

Distances between all the dictionary characters, dictionary data of which are stored in the RAM 3, and the unknown character and character codes corresponding to the dictionary characters used for the calculation of the distances are finished to be input to the selecting circuit 113. Then, the selecting circuit 113 stores, in random order, minimum ten distances and character codes corresponding to the distances in the ten distance registers 1130-1 to 1130-10 and the ten character code registers 1135-1 to 1135-10 as recognition candidate data for the one unknown character. The selecting circuit 113 outputs the ten distances and the ten character codes corresponding to the distances in parallel.

Referring back to FIG. 5, the memory input circuits 114-$i$ store the ten distances output by the selecting circuits 113-$i$ and the character codes corresponding to the distances. The memory input circuits 114-$i$ input the ten distances in random order output by the selecting circuits 113-$i$ and the ten character code corresponding to the distances to the memory 1145-$i$ as recognition candidate data. The distances and the character codes input to the memories 1145-1 to 1145-$k$ are still in random order. These recognition candidate data are output from the memories 115-$i$ to the permutation circuits 117-$i$ by the memory output circuits 116-$i$.

Figure 12:
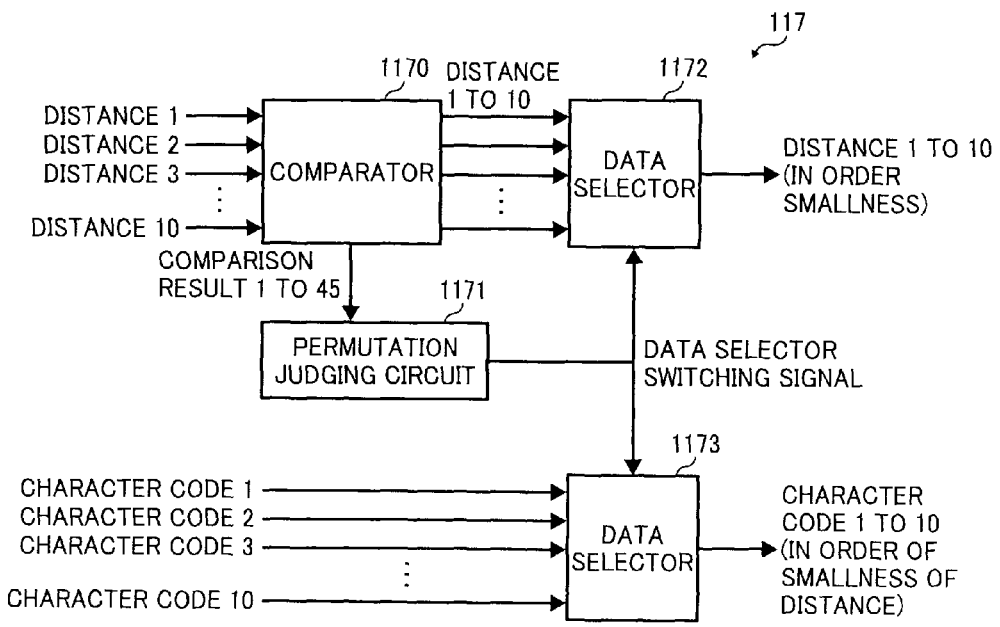
FIG. 12 is a block diagram of a permutation circuit 117.

The permutation circuits 117-$i$ shown in FIG. 6 rearrange, in order from smallest one, the ten distances output from the memory output circuits 116-$i$ as the recognition candidate data and output the distances. The permutation circuits 117-$i$ also output the character codes corresponding to the distances in order from one corresponding to the smallest distance. FIG. 12 is a block diagram of the permutation circuit 117. Because configurations of all the permutation circuits 117-1 to 117-$k$ are the same, when it is unnecessary to distinguish the permutation circuits, the permutation circuits are simply referred to as permutation circuit 117. The permutation circuit 117 includes a comparator 1170, a permutation judging circuit 1171, a data selector 1172, and a data selector 1173. The ten distances (the distances 1 to 10) output from the memory output circuit 116 and the ten character codes (the character codes 1 to 10) corresponding to the distances are input to the comparator 1170. The comparator 1170 outputs a signal indicating comparison results (comparison results 1 to 45) for detecting a size relation among the distances 1 to 10. The signal indicating the comparison results output from the comparator 1170 is input to the permutation judging circuit 1171. The permutation judging circuit 1171 judges ranks of smallness of the distances 1 to 10 and outputs a data selector switching signal indicating the ranks of the distances. The data selector 1172 outputs the distances 1 to 10 in order from smallest one according to the data selector switching signal output from the permutation judging circuit 1171. The data selector 1173 outputs the character codes 1 to 10 in order from one corresponding to the smallest distance according to the data selector switching signal output by the permutation judging circuit 1171.

Figure 13:
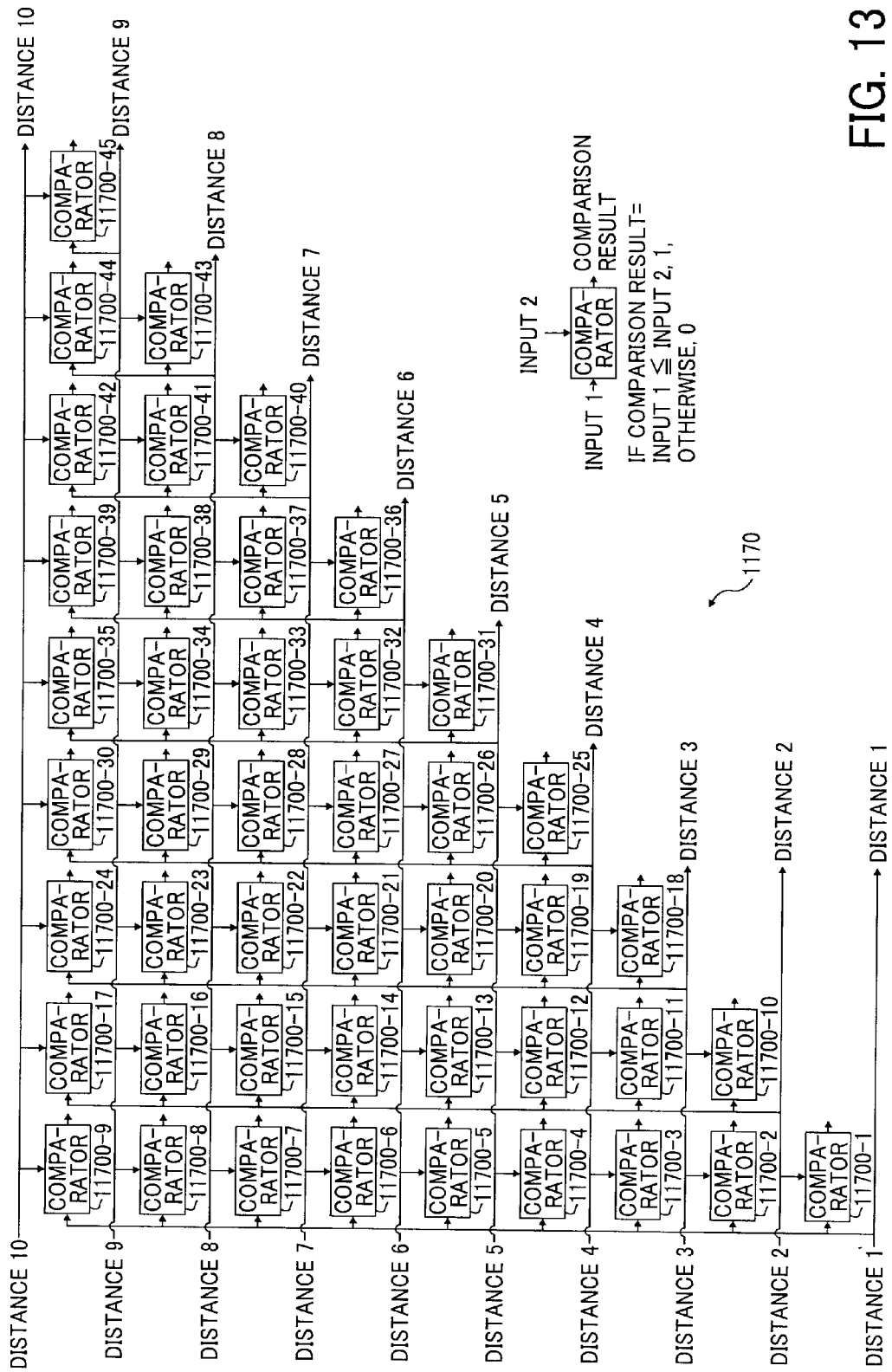
FIG. 13 is a block diagram of a comparator 1170 of the permutation circuit 117.

FIG. 13 is a block diagram of the comparator 1170 of the permutation circuit 117. The comparator 1170 includes, to detect a size relation among the distances 1 to 10, the comparators 11700-1 to 11700-45 in a number (forty-five) of all combinations for extracting two out of the ten distances. Each of the comparators 11700-1 to 11700-45 has two input terminals, i.e., a first input terminal and a second input terminal. The comparator compares a size relation between a distance input to the first input terminal and a distance input to the second input terminal. When the former is equal to or smaller than the latter, the comparator outputs a comparison result "1". When the former is larger than the latter, the comparator outputs a comparison result "0". The comparators 11700-1 to 11700-45 are wired such that a size relation among all the combinations of the ten distances can be detected. In other words, the ranks of the ten distances are determined by arranging the comparators 11700-1 to 11700-45 in a configuration like a round-robin tournament of sports. When the distance input to the first input terminal and the distance input to the second input terminal are the same, a comparison result is the same as that obtained when the former is smaller than the latter. Therefore, in the wiring shown in FIG. 13, the distance input to the first input terminal is regarded as smaller and placed in a higher rank.

Figure 14:
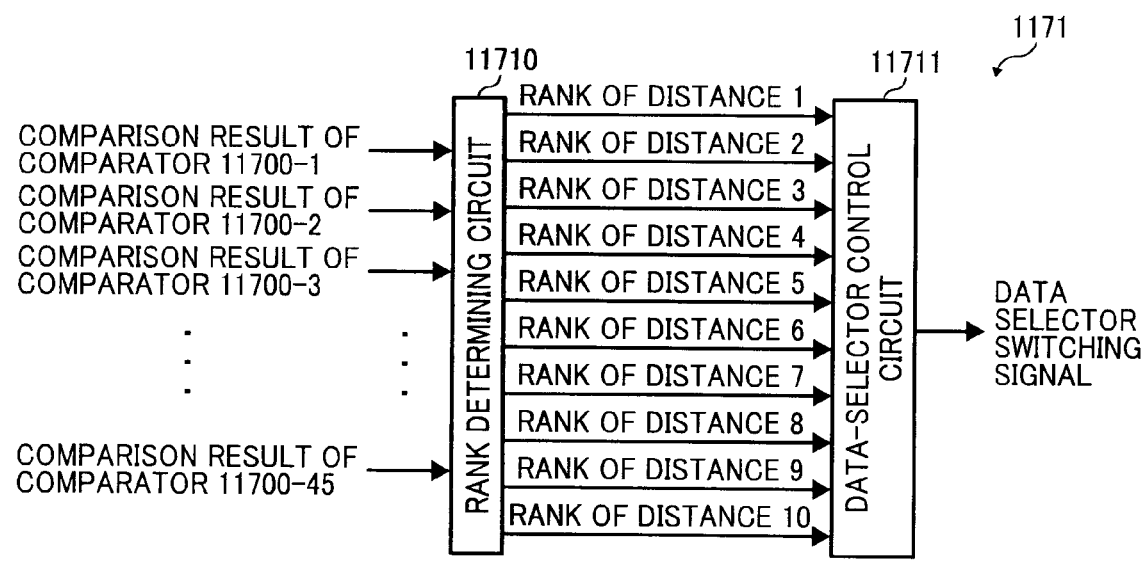
FIG. 14 is a block diagram of a permutation judging circuit 1171 of the permutation circuit 117.

FIG. 14 is a block diagram of the permutation judging circuit 1171 of the permutation circuit 117. The permutation judging circuit 1171 includes a rank determining circuit 11710 and a data-selector control circuit 11711. The rank determining circuit 11710 determines the ranks of smallness of the distances 1 to 10 according to comparison results of the forty-five comparators 11700-1 to 11700-45. The data-selector control circuit 11711 outputs the distances, the ranks of which are determined by the rank determining circuit 11710, in order from smallest one.

Figure 15:
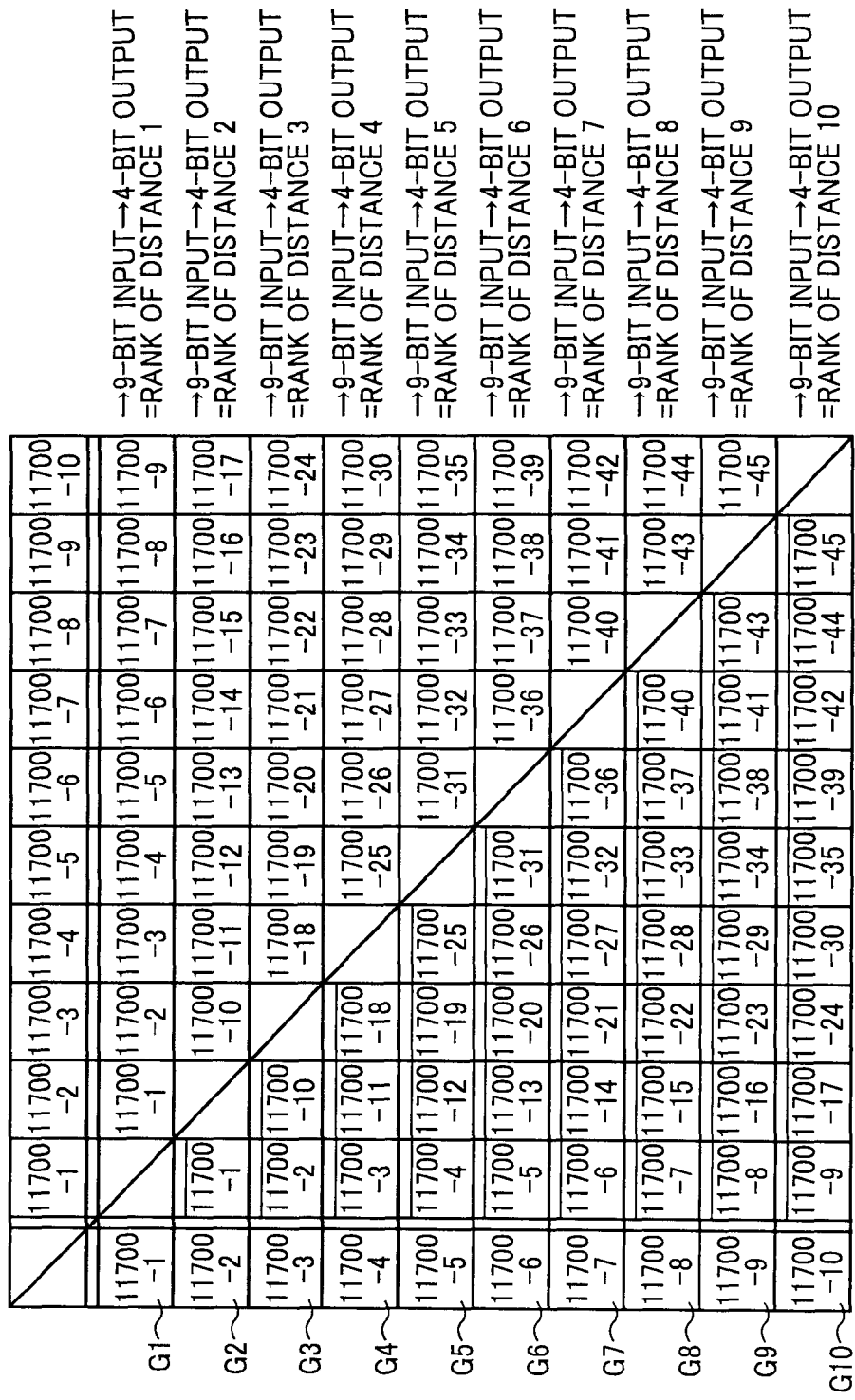
FIG. 15 is a table of a relation between comparison results input from comparators 11700-1 to 11700-45 to an rank determining circuit 11710 and ranks of distances determined based on the comparison results.

FIG. 15 is a table of a corresponding relation between comparison results input from the comparators 11700-1 to 11700-45 to the rank determining circuit 11710 and the ranks of the distances determined based on the comparison results. In the figure, the comparison results (1-bit data signals) of the comparators 11700-1 to 11700-45 are shown like a tournament result table of a round-robin tournament. In the figure, reference numerals 11700-1 to 11700-45 with bars indicate NOT values of comparison results of the comparators 11700-1 to 11700-45. For example, when comparison results of the comparators 11700-1 to 11700-45 indicate "1", reference numerals 11700-1 to 11700-45 with bars indicate "0". When comparison results of the comparators 11700-1 to 1170-45 indicate "0", reference numerals 11700-1 to 11700-45 with bars indicate "1". Rows G1 to G10 in the figure correspond to the distances 1 to 10, respectively, and indicate comparison results of a size relation between one distance corresponding thereto and the other distances. The comparison results are represented by 9-bit data signals. For example, as shown in the row G1, comparison results between the distance 1 and the distances 2 to 10 are represented by 9-bit data signals output from the comparators 11700-1 to 11700-9, respectively. As shown in the row G2, comparison results between the distance 2 and the distances 1 and 3 to 10 are represented by 9-bit signals of a NOT value of a comparison result output from the comparator 11700-1 and comparison results output from the comparators 11700-10 to 11700-17, respectively.

In other words, a size relation between the respective distances and the other distances are clarified by the 9-bit data signals corresponding to the distances. For example, when comparison results output from all the forty-five comparators 11700-1 to 11700-45 are "1", a 9-bit data signal for the distance 1 is "111111111", which indicates that the distance 1 is equal to or smaller than the other distances 2 to 10. A 9-bit data signal for the distance 2 is "011111111", which indicates that the distance 2 is larger than the distance 1 but is equal to or smaller than the distances 3 to 10. A 9-bit data signal for the distance 3 is "001111111", which indicates that the distance 3 is larger than the distances 1 and 2 but is equal to or smaller than the distances 4 to 10. A 9-bit data signal for the distance 10 is "000000000", which indicates that the distance 10 is larger than all the other distances 1 to 9. In other words, among the 9-bit signals, a 9-bit signal having a larger number of "1" (a larger number of bits indicating "1") as a value indicates that a distance indicated by the 9-bit signal has a higher rank. When the number of "1" is nine, i.e., all values of a 9-bit data signal are "1", a rank of a distance indicated by the 9-bit signal is a first place and is a minimum among the ten distances. When the number of "1" in a 9-bit data signal is eight, a rank of a distance indicated by the 9-bit data signal is a second place. When the number of "1" in a 9-bit data signal is zero, a rank of a distance indicated by the 9-bit data signal is a tenth place and is a maximum among the ten distances. In this way, by counting the number of "1" (the number of bits) for all patterns of data signals that can be formed by nine bits, it is possible to determine ranks of distances indicated by the 9-bit data signals. The ranks can be represented by four bits because the ranks are from the first place to the tenth place. Such association of 4-bit output values indicating the ranks with 9-bit input values is realized by a logic circuit (not shown). The association can be realized by a table stored in the ROM 4 instead of the logic circuit.

Figure 16:
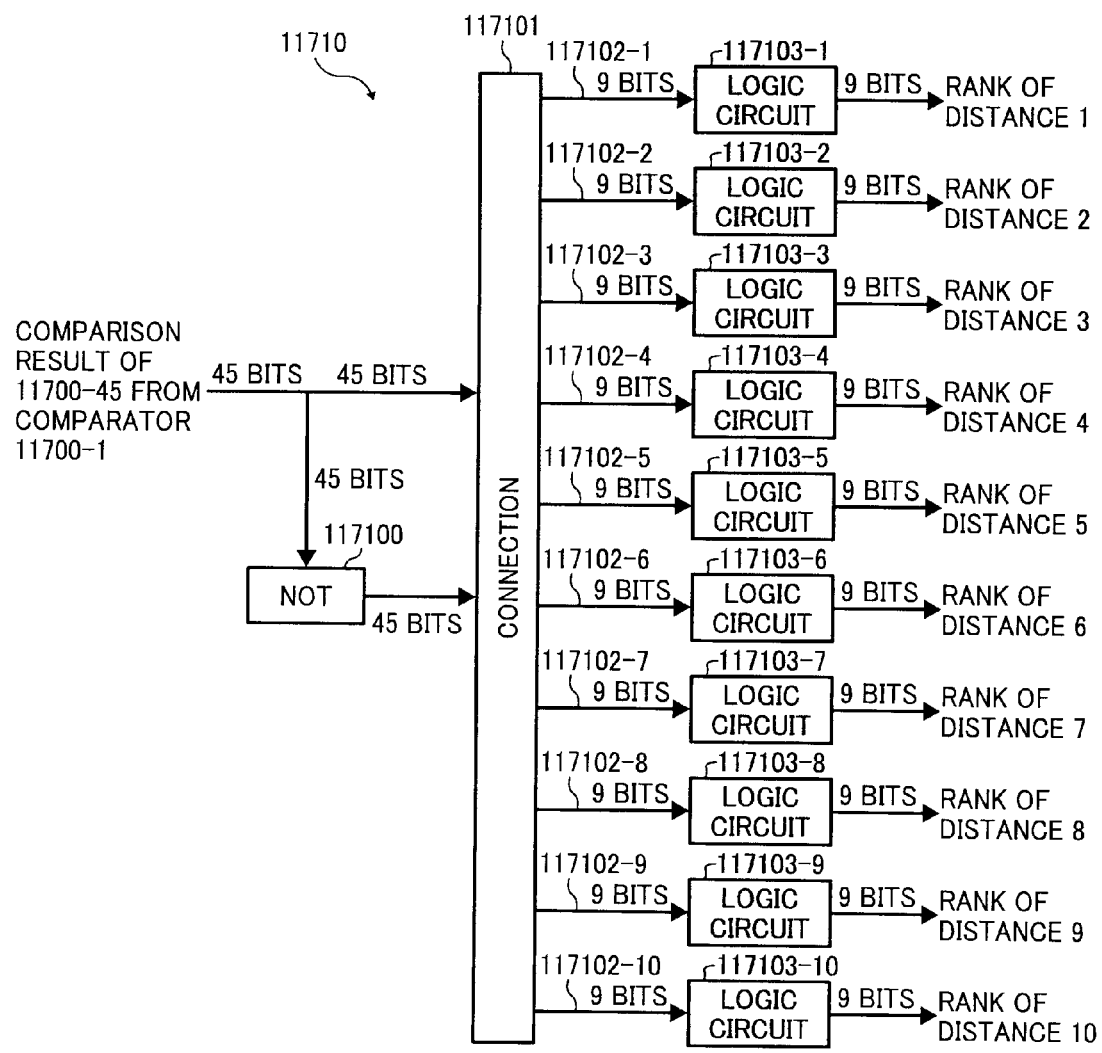
FIG. 16 is a block diagram of the rank determining circuit 11710 of the permutation judging circuit 1171 shown in FIG. 14.

FIG. 16 is a block diagram of the rank determining circuit 11710 of the permutation judging circuit 1171 shown in FIG. 14. The rank determining circuit 11710 includes a NOT circuit 117100, a connection 117101, and logic circuits 117103-1 to 117103-10. 45-bit signals of comparison results from the comparators 11700-1 to 11700-45 are input to the rank determining circuit 11710. The rank determining circuit 11710 outputs NOT values of the comparison results from the NOT circuit 117100. The rank determining circuit 11710 divides, in the connection 117101, data signal of 90 bits in total of the comparison result and the NOT values of the comparison results into data signals of 9 bits corresponding to the distances 1 to 10, respectively, according to the correspondence relation shown in FIG. 14 and sends the data signals to ten sets of data lines 117102-1 to 117102-10. For example, the rank determining circuit 11710 outputs data signals indicating the comparison results from the comparators 11700-1 to 1170-9 to the data lines 117102 as one set of 9-bit data signals corresponding to the distance 1. The rank determining circuit 11710 outputs data signals indicating the NOT value of the comparison results from the comparator 11700-1 and the comparison results from the comparators 11700-10 to 11700-17 to the data line 117102-2 as a set of 9-bit data signals corresponding to the distance 2. The rank determining circuit 11710 outputs data signals indicating the NOT values of the comparison results from the comparators 11700-9, 11700-17, 11700-24, 11700-30, 11700-35, 11700-39, 11700-42, 11700-44, and 11700-45 to the data line 117102-10 as a set of 9-bit data signals corresponding to the distance 10. The ten sets of 9-bit data signals corresponding to the distances 1 to 10 are input to the logic circuits 117103-1 to 117103-10 corresponding thereto, respectively. The logic circuits 117103-1 to 117103-10 output the 4-bit output values indicating the ranks of the distances.

The function of the logic circuits 117103-1 to 117103-10 can be realized by the table stored in the ROM 4.

Figure 17:
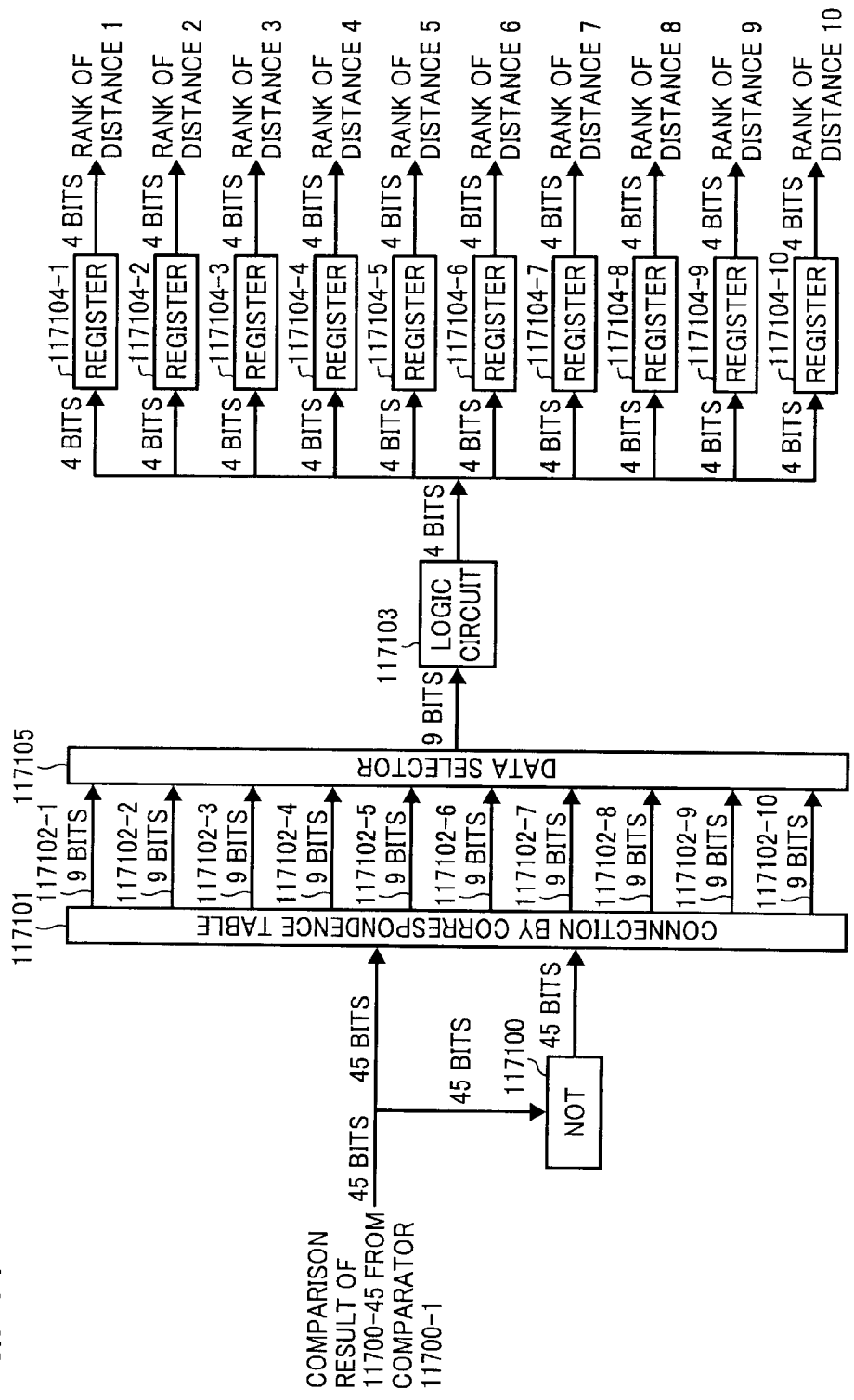
FIG. 17 is a block diagram of another example of the rank determining circuit 11710 of the permutation judging circuit 1171 shown in FIG. 14.

FIG. 17 is a block diagram of another example of the rank determining circuit 11710 of the permutation judging circuit 1171 shown in FIG. 14. In the example shown in FIG. 16, all the ten logic circuits 117103-1 to 117103-10 are the same. Therefore, a configuration of one logic circuit 117103 representing these logic circuits is shown in FIG. 17. The rank determining circuit 11710 includes the NOT circuit 117100, the connection 117101, the data selector 117105, the logic circuit 117103, and the registers 117104-1 to 117104-10. As in the example shown in FIG. 16, the 45-bit data signals of the comparison results of the comparators 11700-1 to 11700-45 are input to the rank determining circuit 11710. The rank determining circuit 11710 divides the 45-bit data signals into data signals of 9 bits corresponding to the distances 1 to 10 and sends the data signals to the ten sets of data lines 117102-1 to 117102-10.

The 9-bit data signals output from the ten sets of data lines 117102-1 to 117102-10 are input to the data selector 117105. The data selector 117105 outputs the 9-bit data signals to the logic circuit 117103 in order one by one. The ten sets of 9-bit data signals corresponding to the distances 1 to 10 are input to the logic circuit 117103 in order one by one. The logic circuit 117103 writes the 4-bit output value indicating the ranks of the distances in one of the ten registers 117104-1 to 117104-10. In other words, the rank determining circuit 11710 switches the data signals output to the logic circuit 117103 in the data selector 117105, writes the ranks determined by the 9-bit data signals in the registers 117104-1 to 117104-10 one by one using the logic circuit 117103, and stores the ranks of the distances 1 to 10 in the ten registers 117104-1 to 117104-10. With such a configuration, compared with the configuration shown in FIG. 16, the number of logic circuits 117103 can be reduced. Therefore, a circuit size can be reduced. The function of the logic circuit 117103 can be realized by the table stored in the ROM 4.

With the configuration described above, the ranks of the ten distances in random order output by the selecting circuit 113 are determined and output.

Figure 18:
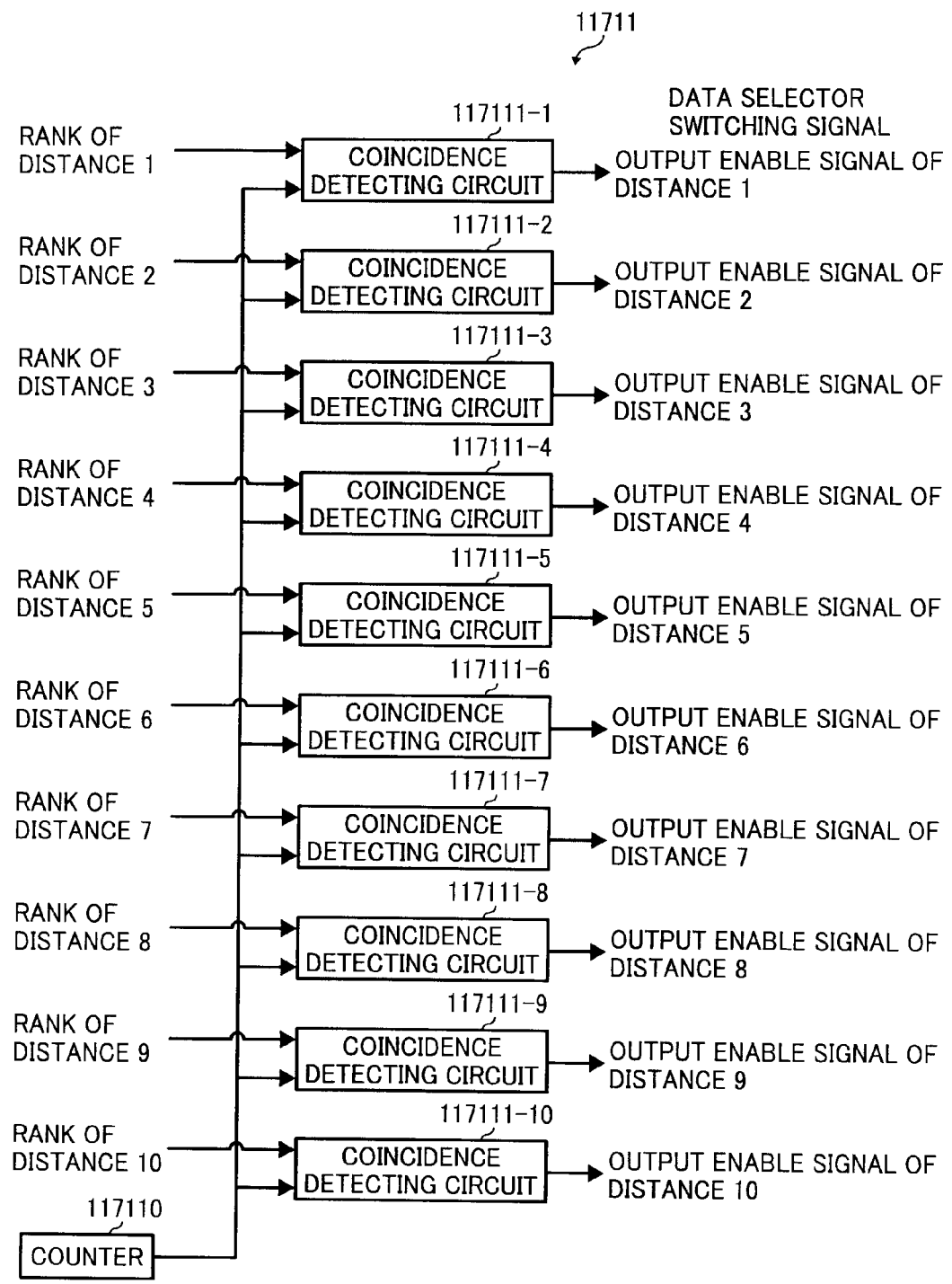
FIG. 18 is a block diagram of a data-selector control circuit 11711 of the permutation judging circuit 1171.

FIG. 18 is a block diagram of the data-selector control circuit 11711 of the permutation judging circuit 1171. The data-selector control circuit 11711 includes a counter 117110 and coincidence detecting circuits 117111-1 to 117111-10. The ranks of the distances output by the rank determining circuit 11710 are input to the data-selector control circuit 11711. The data-selector control circuit 11711 outputs the distances in order from smallest one and outputs the character codes corresponding to the distances in order of the ranks of the distances. Each of the coincidence detecting circuits 117111-1 to 117111-10 has two input terminals, i.e., a first input terminal and a second input terminal. The ranks of the distances 1 to 10 are input to the first input terminal of each of the coincidence detecting circuits 117111-1 to 117111-10. A value output from the counter 117110 is input to the second input terminal. The counter 117110 continuously outputs values "1" to "10". When two input values input to the two input terminals coincide with each other, each of the coincidence detecting circuits 117111-1 to 117111-10 outputs a 1-bit data signal "1". Otherwise, each of the coincidence detecting circuits 117111-1 to 117111-10 outputs a 1-bit data signal "0". In other words, the 1-bit data signal output by each of the coincidence detecting circuits 117111-1 to 117111-10 is "1" only when a value output from the counter 117110 and a value of a rank coincide with each other. Consequently, the 1-bit data signal output by each of the coincidence detecting circuits 117111-1 to 117111-10 is "1" only once according to the value of the rank with respect to the values "1" to "10" continuously output from the counter 117110. Otherwise, the 1-bit data signal is "0". 1-bit data signals output from the coincidence detecting circuits 117111-1 to 117111-10 are set as output enable signals for the distances. The coincidence detecting circuits 117111-1 to 117111-10 output the output enable signals as data selector switching signals for outputting the distances 1 to 10 in the order of the ranks of the distances 1 to 10.

The coincidence detecting circuits 117111-1 to 117111-10 input the data selector switching signals to the data selector 1172 and the data selector 1173 of the permutation circuit 117 shown in FIG. 12. The data selector 1172 outputs the distances 1 to 10 in order from smallest one according to the data selector switching signals.

Figure 19:
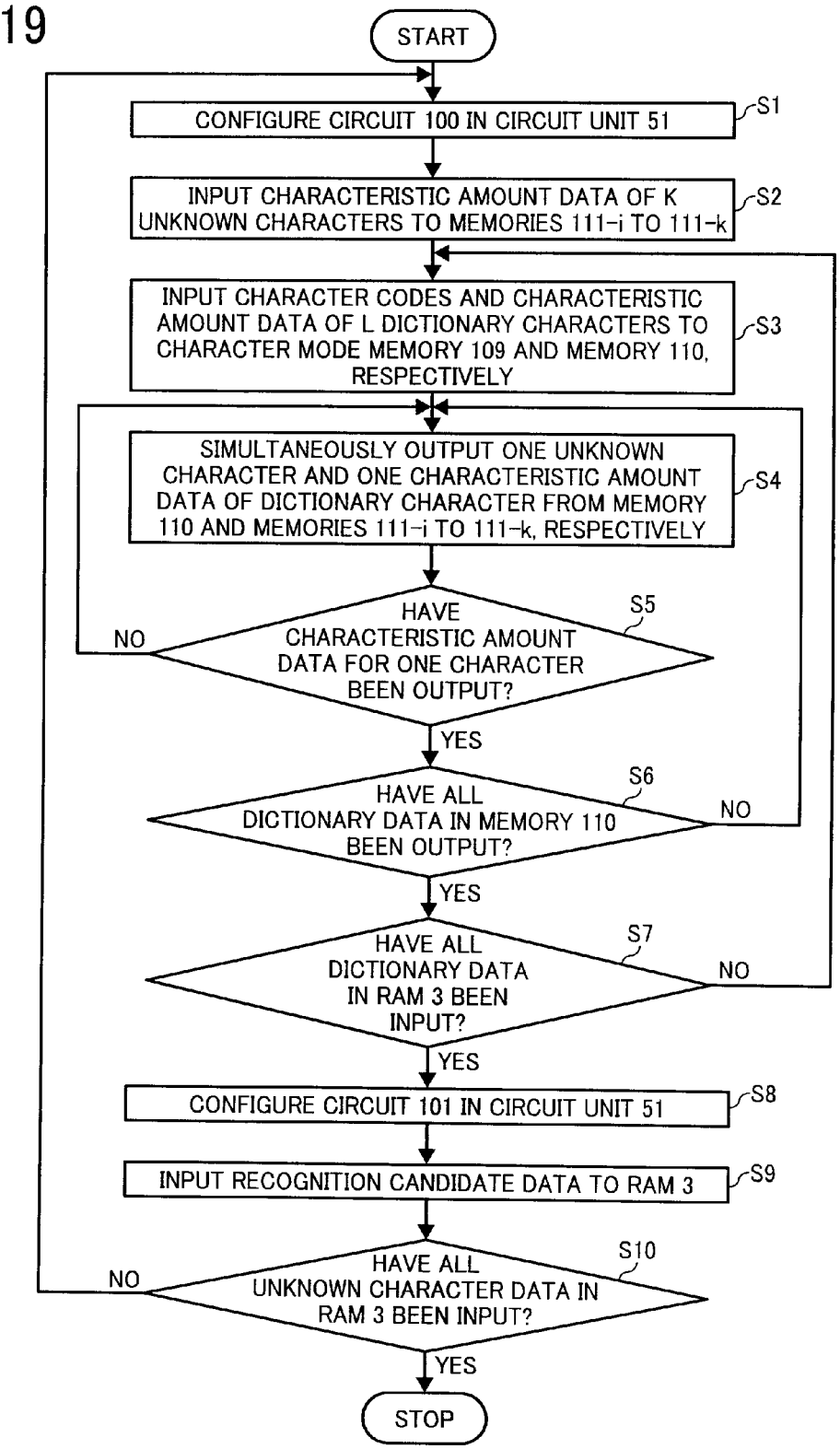
FIG. 19 is a flowchart of a procedure of matching processing in character recognition processing.

FIG. 19 is a flowchart of a procedure of matching processing performed by the character recognizing apparatus 1. It is assumed that dictionary data for all dictionary characters registered in a dictionary and unknown character data for a plurality of unknown characters as processing objects are stored in the RAM 3 in advance. The CPU 50 of the LSI 5 of the character recognizing apparatus 1 configures the circuit 100 shown in FIG. 5 in the circuit unit 51 (Step S1). Details of a procedure for configuring the circuit 100 in the circuit unit 51 are described later. Subsequently, the CPU 50 transfers unknown character data (characteristic amount data) for k unknown characters from the RAM 3 to the circuit unit 51 via the data bus 55 and the interface 3 and inputs the unknown characters to the memories 111-1 to 111-$k$ one by one (Step S2). In other words, characteristic amount data for one character of an ith unknown character is input to the memories 111-$i$. The CPU 50 transfers character codes and characteristic amount data included in the dictionary data for L dictionary characters among the dictionary data stored in the RAM 3 to the circuit unit 51, inputs the character codes to the character code memory 109, and inputs the characteristic amount data to the memory 110 (Step S3). The memory 110 outputs characteristic amount data for one dictionary character and the memories 111-1 to 111-$k$ simultaneously output characteristic amount data for the input one unknown character (Step S4). The characteristic amount data for the dictionary character output from the memory 110 and the characteristic amount data for the unknown character output from the memory 111-$i$ are input to the distance calculating circuits 112-$i$.

The CPU 50 judges whether all the characteristic amount data for one character, i.e., data of all dimensions of M dimensions have been output (Step S5). When a result of the judgment is negative, the CPU 50 returns to Step S4. When the judgment result at Step S5 is positive, i.e., when the data of all the dimensions of the M dimensions have been output as all the characteristic amount data for one character, the distance calculating circuits 112-1 to 112-$k$ outputs distances between one unknown character and one dictionary character, respectively. As a result, distances between the k unknown characters and the one dictionary character are output. At this point, the character code memory 109 outputs a character code for this dictionary character. The character code output by the character code memory 109 and the distances output by the distance calculating circuits 112-$i$ are input to the selecting circuits 113-$i$. The selecting circuits 113-$i$ judge whether the input distances correspond to minimum ten distances and store the minimum ten distances and character codes corresponding to the distances.

The CPU 50 judges whether all the dictionary data input to the memory 110 have been output (Step S6). When a result of the judgment is negative, the CPU 50 returns to Step S4. In this way, by repeating the processing at Steps S2 to S5, the CPU 50 calculates distances using the characteristic amount data included in the dictionary data for the dictionary characters for the characters input to the memory 110 and the characteristic amount data of the unknown characters input to the memories 111-1 to 111-$i$. When the judgment result at Step S6 is affirmative, i.e., all the dictionary data input to the memory 110 have been output, the CPU 50 judges whether all the dictionary data stored in the RAM 3 have been input (Step S7). When a result of the judgment is negative, the CPU 50 returns to Step S3. The CPU 50 inputs character codes and characteristic amount data included in dictionary data not input to the memory 110 among the dictionary data stored in the RAM 3 to the character code memory 109 and the memory 110. When all the dictionary data stored in the RAM 3 have been input, the judgment result at Step S7 is affirmative. In this case, ten minimum distances for the k unknown characters and character codes corresponding to the distances are stored in the selecting circuits 113-1 to 113-$k$ as recognition candidate data. The recognition candidate data are input to the memories 115-1 to 115-$k$ via the memory input circuits 114-1 to 114-$k$.

Thereafter, the CPU 50 configures the circuit 101 shown in FIG. 6 in the circuit unit 51 while keeping the recognition candidate data stored in the memories 115-1 to 115-$k$ (Step S8). In other words, the CPU 50 rewrites the circuit configuring the circuit unit 51 from the circuit 100 to the circuit 101. The recognition candidate data stored in the memories 115-$i$ are input to the permutation circuits 117-$i$ via the memory output circuits 116-$i$. The permutation circuits 117-1 to 117-$k$ determine ranks in order from smallest distance. The data selector 118 outputs the ten distances in order from smallest one as recognition candidate data and outputs the character data in order from one corresponding to the smallest distance. The CPU 50 of the LSI 5 writes the output recognition candidate data in the RAM 3 via the data bus 55 and the interface 53 (Step S9). In this way, the matching processing for the k unknown characters input to the memories 111-1 to 111-$k$ is performed in parallel and ten recognition candidate data for the unknown characters are obtained. Then, the matching processing for the k unknown characters is finished. Subsequently, the CPU 50 judges whether unknown character data for all the unknown characters stored in the RAM 3 have been input (Step S10). When a result of the judgment is negative, the CPU 50 returns to Step S1. Thereafter, the CPU 50 applies matching processing same as the above to new k unknown characters. When the unknown character data corresponding to the unknown characters stored in the RAM 3 have been input, the judgment result at Step S10 is affirmative and the matching processing is finished. In this case, ten distances sorted in order from one having smallest value and character codes corresponding to the distances are stored in the RAM 3 as recognition candidate data for all the unknown characters.

As a result, the CPU 10 shown in FIG. 1 appropriately can read out the recognition candidate data stored in the RAM 3 via the interfaces 52 and 53 and perform the processing in (e) described above.

Figure 20:
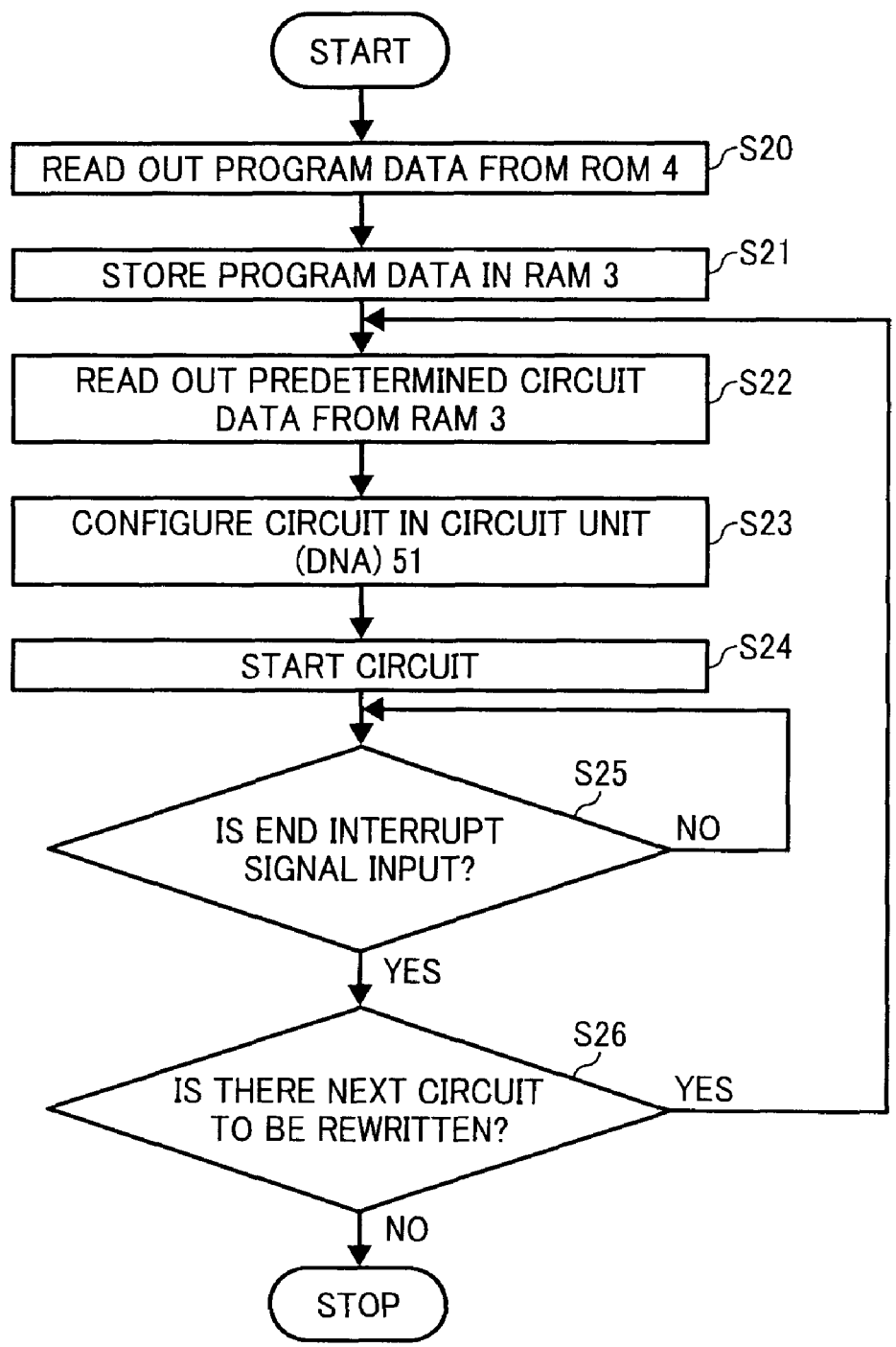
FIG. 20 is a flowchart of a procedure of processing for rewriting a circuit configured in the circuit unit 51 by a CPU 50 of the LSI 5.

FIG. 20 is a flowchart of a procedure for rewriting a circuit configured in the circuit unit 51 by the CPU 50 of the LSI 5. When a power supply for the LSI 5 is turned on, the CPU 50 reads out program data from the ROM 4 via the data bus 55 and the interface 54 (Step S20). The CPU 50 writes the read-out program data in the RAM 3 via the data bus 55 and the interface 53 (Step S21). The CPU 50 reads out configuration data (circuit data) included in the program data written in the RAM 3 (Step S22) and configures a circuit in the circuit unit 51 using the circuit data (Step S23). At Step S1 in FIG. 19, the CPU 50 configures the circuit 100 in the circuit unit 51.

The CPU 50 outputs a start signal to the circuit unit 51 and actuates the circuit (Step S24). When the circuit actuation in the circuit unit 51 is finished, the circuit unit 51 inputs an end interrupt signal to the CPU 50. The CPU 50 waits for the input of the end interrupt signal (Step S25). When the end interrupt signal is input, the CPU 50 judges whether there is a circuit that should be rewritten next (Step S26). When there is a circuit to be rewritten next ("YES" at Step S26), the CPU 50 proceeds to Step S22. For example, at Step S8 in FIG. 19, the CPU 50 rewrites the circuit configured in the circuit unit 51 from the circuit 100 to the circuit 101. When there is no circuit to be written next ("NO" at Step S26), the CPU 50 finishes the processing.

As described above, the circuit for performing the matching processing is divided into the two circuits, i.e., the circuit 100 and the circuit 101. The circuits 100 and the circuit 101 are configured in the circuit unit 51 of the LSI 5 at the timing described above to perform the matching processing. Therefore, it is possible to set a circuit size far smaller than that of the series of circuits including the circuit 100 and the circuit 101 configured as one circuit in the LSI 5. It is possible to reduce costs for the circuit. Further, it is possible to reduce the number of components and a wiring amount.

A plurality of distance calculating circuits and a plurality of selecting circuits are actuated in parallel, respectively, in one circuit 100 and a plurality of permutation circuits are actuated in parallel in the other circuit 101. This makes it possible to perform the matching processing for a plurality of unknown characters in parallel. Consequently, it is possible to perform the entire character recognition processing at high speed.

A plurality of dictionary data are read out from the RAM 3 to the LSI 5 at a time and a plurality of unknown character data are read out from the RAM 3 to the LSI 5. This makes it possible to reduce the number of times of access to the RAM 3 and reduce processing time.

The matching processing is divided in to selection processing and permutation processing to perform processing for sorting a plurality of recognition candidate data in order from one having a high degree of similarity to an unknown character, i.e., processing for sorting the recognition candidate data in order from one having a smallest distance between dictionary characters and the unknown character. In the selection processing, recognition candidate data are stored in random order every time a distance between one dictionary character and the unknown character is calculated. After the calculation of distances between all the dictionary characters and a plurality of unknown characters is finished, the processing for sorting the recognition candidate data in order from one having a smallest distance is performed as the permutation processing. In other words, timing for performing the permutation processing is after the calculation of the distances between all the dictionary characters and the unknown characters is finished rather than every time the distance between one dictionary character and the unknown character is calculated. Therefore, the speed of the permutation processing can be increased. In the permutation circuit 117 that performs the permutation processing, as explained with reference to FIGS. 12 to 18, the comparators are arranged in a round-robin system configuration. The permutation circuit 117 detects a size relation among the ten distances and determines ranks of the distances. When the permutation processing is executed by hardware in this way, there is no loop processing unlike the permutation processing executed by the CPU using software. Therefore, the speed of the permutation processing can be increased.

On the other hand, in the selecting circuit 113 that performs the selection processing, as explained with reference to FIGS. 9 and 11, the comparators are arranged in a tournament configuration. The selecting circuit 113 detects a maximum among distances (a distance in the tenth place under the present situation) and a register number of a distance register that stores the distance and judges whether a distance input anew is higher in a rank than the tenth place. The selecting circuit 113 simply rewrites a value of the distance of the distance register that holds the distance in the tenth place and stores the distances in random order. When the selection processing is executed by hardware in this way, there is no loop processing unlike the selection processing executed by the CPU using software. The selecting circuit 113 performs the selection processing at appropriate timing according to an output from the distance calculating circuit 112. Therefore, the speed of the selection processing can be increased.

Figure 21:
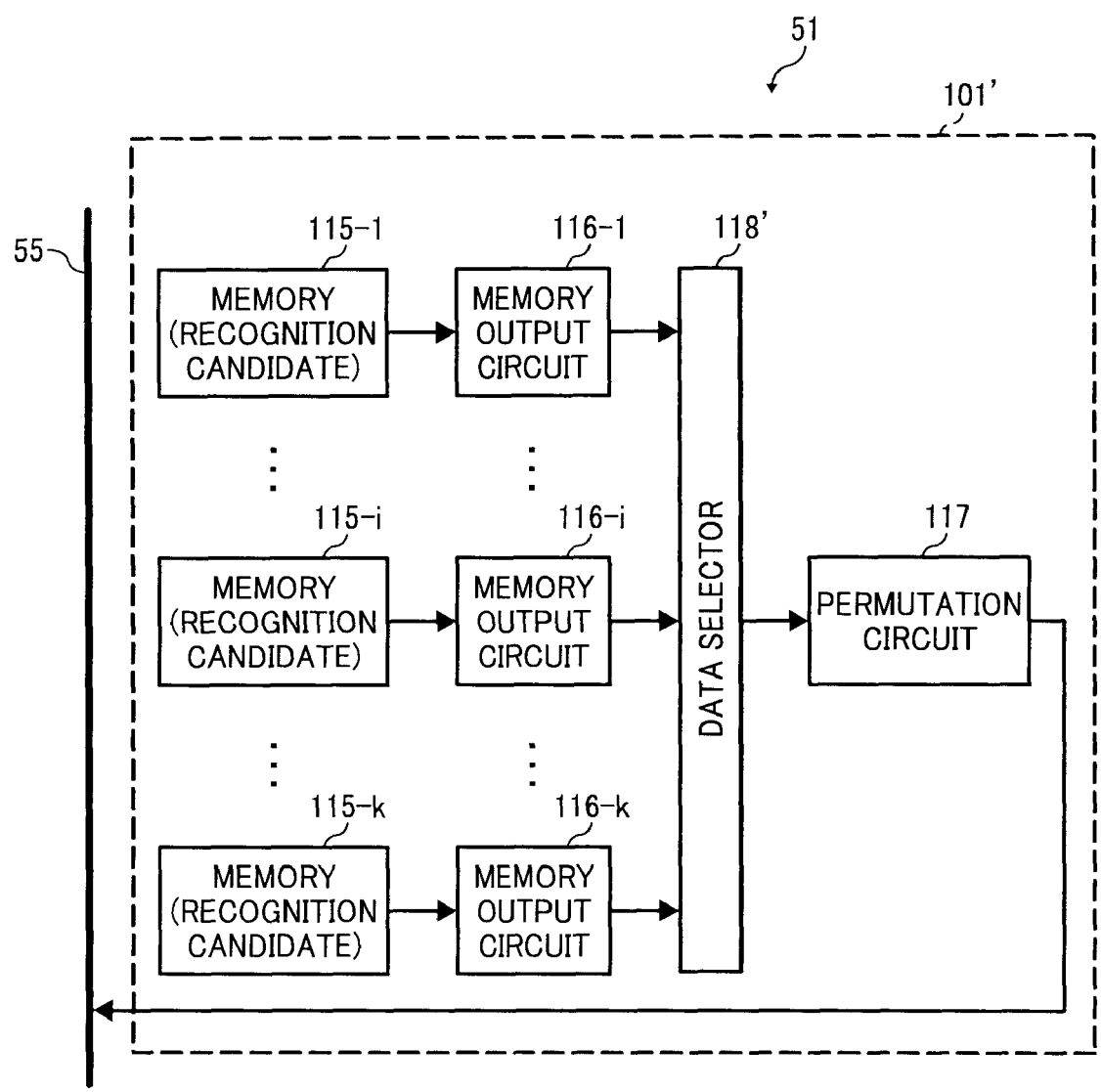
FIG. 21 is a diagram of a configuration of a circuit 101' having only one permutation circuit 117 according to a modification.

In the embodiment described above, the circuit 101 includes the k permutation circuits 117. However, in a modification of the embodiment, the circuit 101 can include only one permutation circuit. FIG. 21 is a diagram of a configuration of a circuit 101' including only one permutation circuit 117. The circuit 101' includes the memories 115-1 to 115-$k$, the memory output circuits 116-1 to 116-$k$, a data selector 18', and the permutation circuit 117. Configuration of the memories 115-1 to 115-$k$ and the memory output circuits 116-1 to 116-$k$ are substantially the same as those described above. Ten distances in random order output from the memory output circuits 116-1 to 116-$k$ as recognition candidate data and ten character codes corresponding to the distances are input to the data selector 118' from the memory output circuits 116-1 to 116-$k$. The data selector 118' outputs sets of one distance and character codes corresponding to the distance to the permutation circuit 117 one by one in random order. A configuration of the permutation circuit 117 is substantially the same as that described above.

In such a circuit configuration, at Step S8 in FIG. 19, the CPU 50 of the LSI 5 configures the circuit 101' shown in FIG. 21 in the circuit unit 51 rather than the circuit 101. Recognition candidate data stored in the memories 115-$i$ is input to the permutation circuit 117 via the memory output circuits 116-$i$. The permutation circuit 117 determines ranks in order of smallness of distances and outputs the recognition candidate data from one having a smallest distance. At Step S9, the CPU 50 of the LSI 5 writes the recognition candidate data output from the permutation circuit 117 in the RAM 3 via the data bus 55 and the interface 53. Other steps of the processing are the same as those in the embodiment described above.

Permutation circuits use a large number of comparators and have a large circuit size. Therefore, if the permutation circuits can be reduced to one permutation circuit by adopting the configuration described above, a circuit size of the LSI 5 can be further reduced.

One of the circuit 101 and the circuit 101' can be used as a circuit following the circuit 100. Therefore, the circuits in the LSI 5 can be configured more flexibly. Both configuration data for configuring the circuit 101 and configuration data for configuring the circuit 101' can be included in one or a plurality of program data and stored in the ROM 4. One of the configuration data can be selected as a circuit following the circuit 100 according to a predetermined selection condition and used. With such a configuration, it is possible to select and actuate the circuit 101 or the circuit 101' taking into account processing efficiency, processing time, a circuit size, and the like. It is possible to more effectively realize the execution of the entire character recognition processing.

A matching device according to a second embodiment of the present invention is explained. Components same as those in the first embodiment are denoted by the same reference numerals and signs and explained or explanation of the components is omitted.

Figure 22:
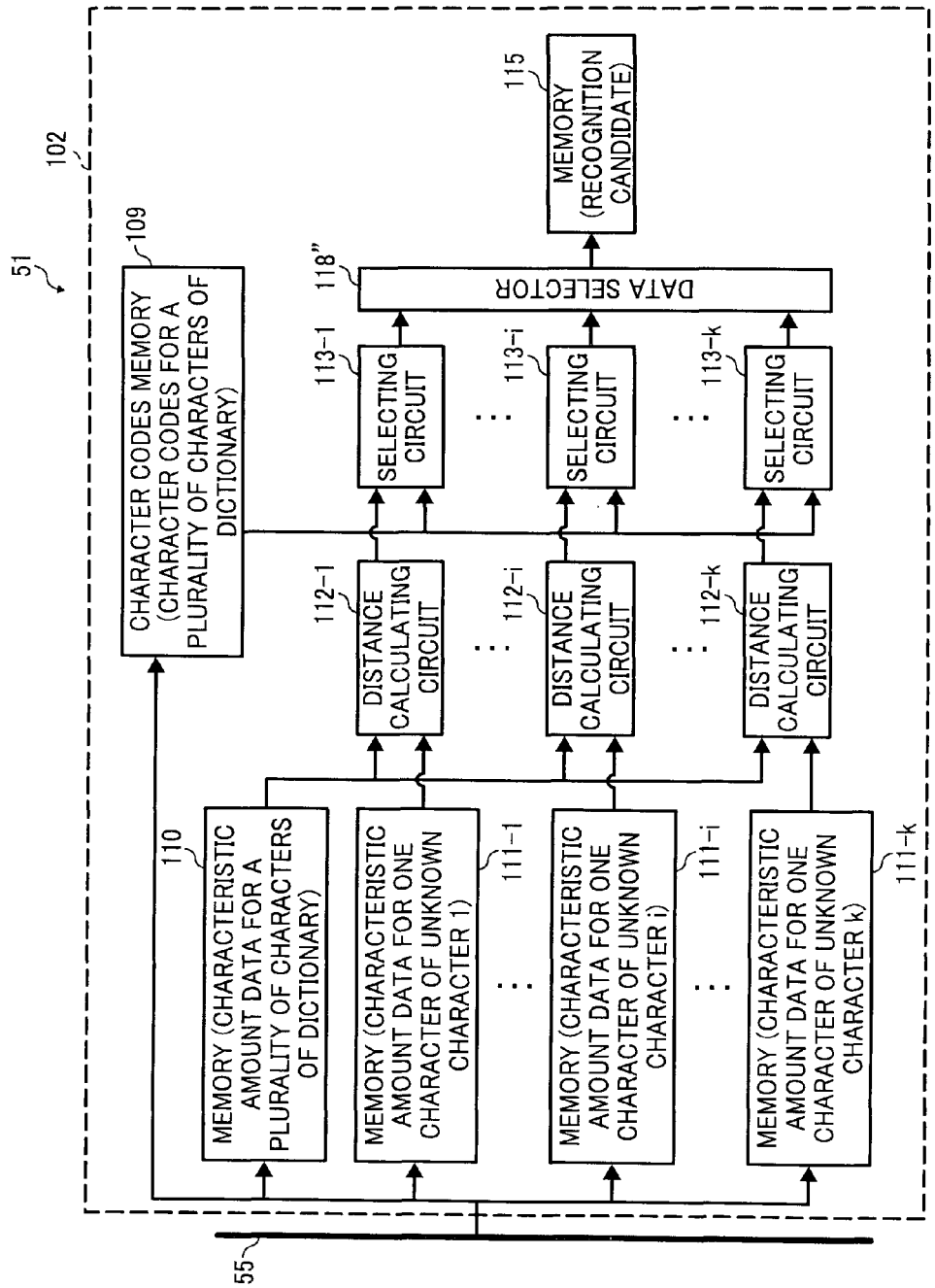
FIG. 22 is a diagram of a circuit configured in the circuit unit 51 of the LSI 5 according to a second embodiment of the present invention.
Figure 23:
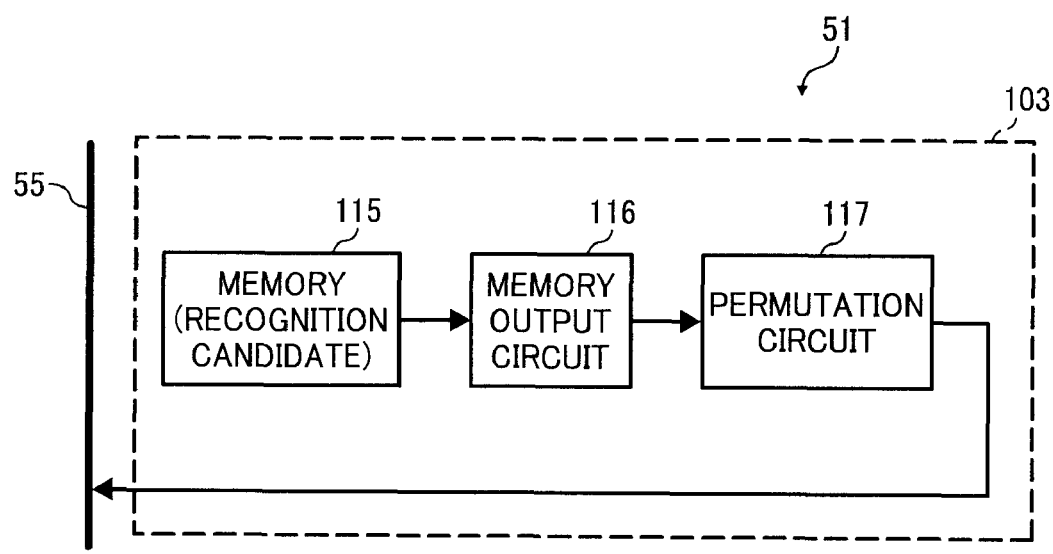
FIG. 23 is a diagram of a circuit configured in the circuit unit 51 of the LSI 5.

FIGS. 22 and 23 are diagrams of a configuration of a circuit configured in the circuit unit 51 of the LSI 5 according to this embodiment. In this embodiment, a circuit 102 shown in FIG. 22 is configured in the circuit unit 51 instead of the circuit 100 in the first embodiment. A circuit 103 shown in FIG. 3 is configured in the circuit unit 51 instead of the circuit 101. The circuit 102 includes the character code memory 109, the memory 110, the k memories 111-1 to 111-k, the k distance calculating circuits 112-1 to 112-k, the k selecting circuits 113-1 to 113-k, a data selector 118", and the memory 115. The circuit 100 described above includes the k memory input circuits 114-1 to 114-k and includes the k memories 115 as the memories that store recognition candidate data. However, the circuit 102 in this embodiment does not include the memory input circuits 114-1 to 114-k and includes only one memory 115 as a memory that stores recognition candidate data. Configurations of the character code memory 109, the memory 110, the k memories 111-1 to 111-k, the k distance calculating circuits 112-1 to 112-k, and the k selecting circuits 113-1 to 113-k are the same as those in the first embodiment. The data selector 118" outputs ten distances selected by the selecting circuits 113-1 to 113-k and character codes corresponding to the distances to the memory 115 as recognition candidate data in random order.

On the other hand, the circuit 103 shown in FIG. 23 is a circuit following the circuit 102 and includes the memory 115, the memory output circuit 116, and the permutation circuit 117. The circuit 101 described above includes, in association with the k memories 115-1 to 115-k, the k memory output circuits 116 and the k permutation circuits 117. However, the circuit 103 in this embodiment includes only one circuit 103, one memory 115, one memory output circuit 116, and one permutation circuit 117. Configurations of the memory 115, the memory output circuit 116, and the permutation circuit 117 are the same as those in the first embodiment.

A procedure of matching processing performed by the character recognizing apparatus 1 according to this embodiment is described below. A flowchart of a procedure of the matching processing is substantially the same as that shown in FIG. 18. Therefore, the flowchart is not shown as a figure. Only differences from the first embodiment are explained. At Step S1, the CPU 50 of the LSI 5 configures the circuit 102 shown in FIG. 22 in the circuit unit 51. Steps S2 to S7 are the same as those in the first embodiment. When the judgment result at Step S7 is affirmative, ten minimum distances for the k unknown characters and character codes corresponding to the distances are stored in the selecting circuits 113-1 to 113-k as recognition candidate data. The recognition candidate data are input to the memory 115 via the data selector 118".

Thereafter, at Step S8, the CPU 50 configures the circuit 103 shown in FIG. 23 in the circuit unit 51 while keeping the recognition candidate data stored in the memory 115. The recognition candidate data stored in the memory 115 is input to the permutation circuit 117 via the memory output circuit 116. The permutation circuit 117 determines ranks in order of smallness of distances and outputs the recognition candidate data in order from one having a smallest distance. At Step S9, the CPU 50 of the LSI 5 writes the recognition candidate data output from the permutation circuit 117 in the RAM 3 via the data bus 55 and the interface 53. Steps after Step S9 are the same as those in the first embodiment.

With the configuration described above, compared with the first embodiment, the k memory input circuits 114-1 to 114-k are unnecessary and the number of memories 115, the number of memory output circuits 116, and the number of permutation circuits 117 can be reduced. As a result, it is possible to substantially save memory resources of the LSI 5 and reduce a circuit size. Further, it is possible to reduce the number of components and a wiring amount and further reduce cost.

A character recognizing apparatus according to a third embodiment of the present invention is explained. Components same as those in the first and second embodiments are denoted by the same reference numerals and signs and explained or explanation of the components is omitted.

In the first embodiment, the dictionary data for the dictionary characters are configured to include the character codes for the dictionary characters. However, in this embodiment, dictionary data does not include character codes. In matching processing, as shown in FIG. 3, serial numbers associated with the dictionary data are used instead of the character codes. For example, data indicating a correspondence relation between the serial numbers and the character codes is stored in the hard disk 13 of the character recognizing apparatus 1. Consequently, the CPU 10 can recognize the character codes from the serial numbers.

Figure 24:
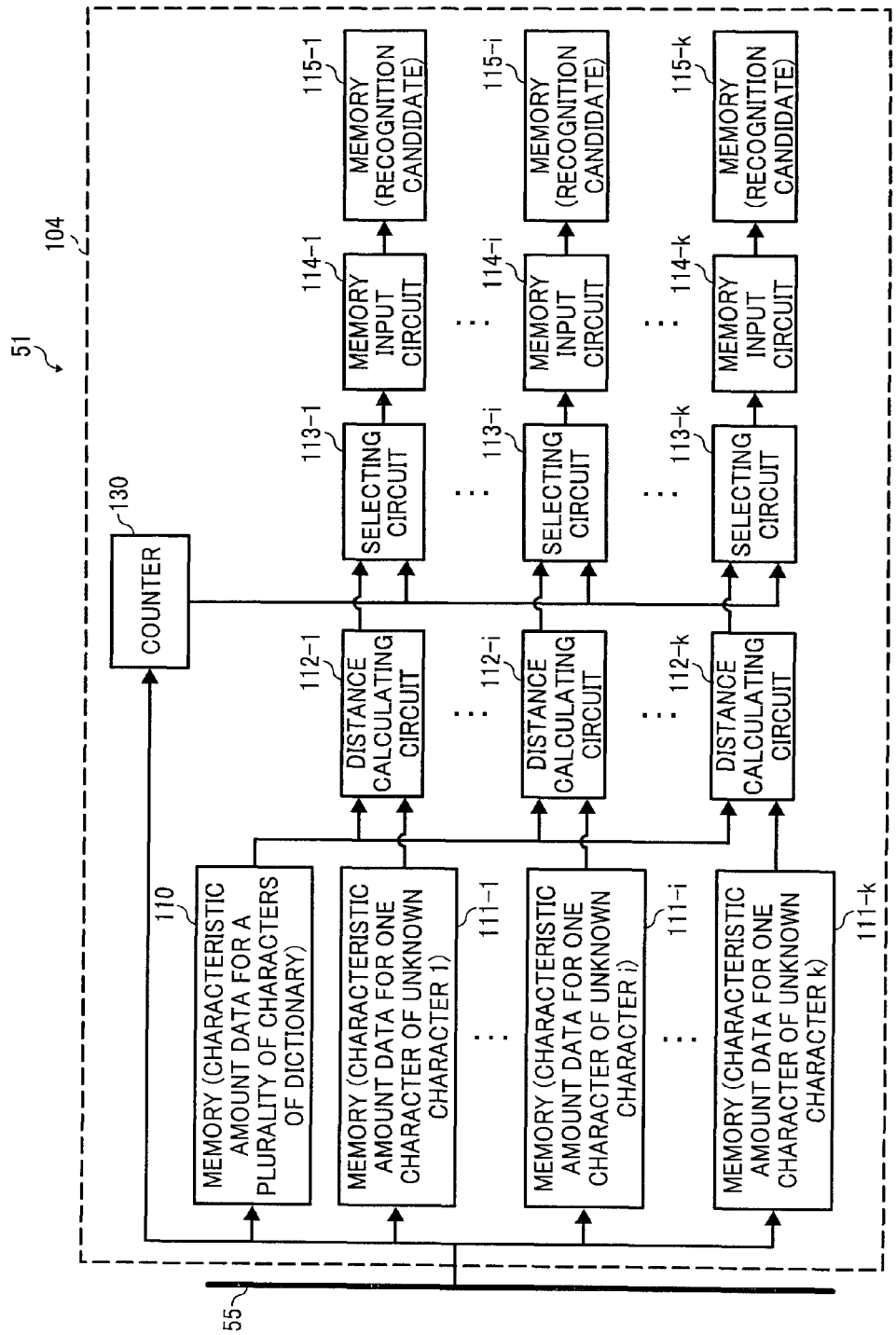
FIG. 24 is a diagram of a circuit configured in the circuit unit 51 of the LSI 5 according to a third embodiment of the present invention.

FIG. 24 is a diagram of a configuration of a circuit configured in the circuit unit 51 of the LSI 5 according to this embodiment. In this embodiment, a circuit 104 shown in FIG. 24 is configured in the circuit unit 51 instead of the circuit 100 in the first embodiment. The circuit 104 is different from the circuit 100 in the first embodiment in that the circuit 104 includes a counter 130 instead of the character code memory 109. The characteristic amount data included in the dictionary data stored in the RAM 3 are input to the memory 110 in order of serial numbers associated with the dictionary data. The memory 110 outputs the characteristic amount data in order of the serial numbers. The counter 130 increases a counter value and outputs the counter value every time the characteristic amount data is output for each of characters from the memory 110. The counter value is equivalent to the serial numbers. The selecting circuits 113-i output ten distances and serial numbers corresponding to the distances to the memory input circuits 114-i in random order as recognition candidate data using the serial numbers output from the counter 130 in the same manner as the character codes in the first embodiment.

Figure 25:
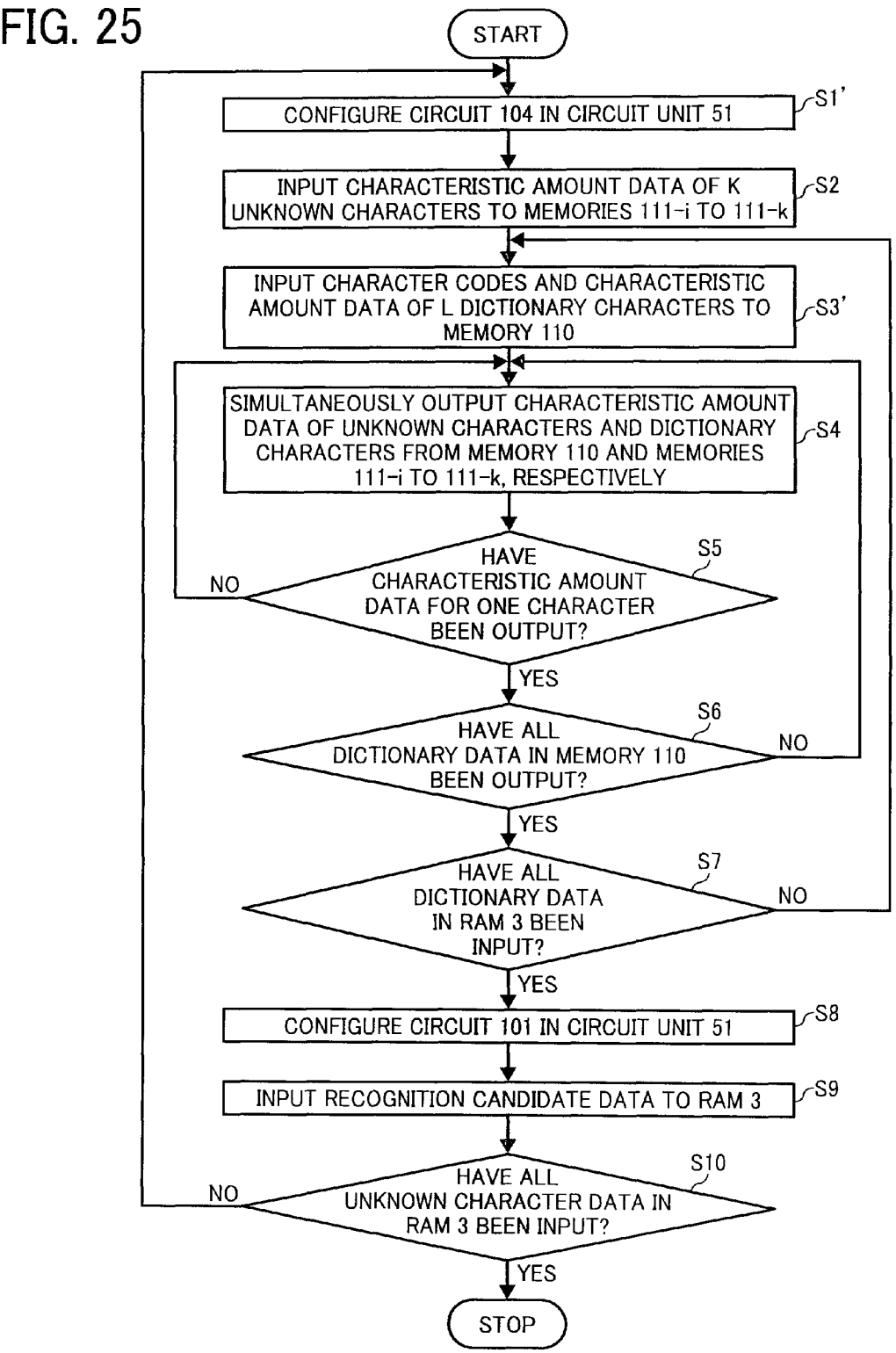
FIG. 25 is a flowchart of a procedure of matching processing performed by the character recognizing apparatus 1.

FIG. 25 is a flowchart of a procedure of matching processing performed by the character recognizing apparatus 1 according to this embodiment. Differences from the first embodiment are explained.

At Step S1', the CPU 50 of the LSI 5 configures the circuit 104 shown in FIG. 24 in the circuit unit 51. Step S2 is the same as that in the first embodiment. At Step S3', the CPU 50 transfers characteristic amount data included in dictionary data for L dictionary characters among the dictionary data stored in the RAM 3 to the circuit unit 51 (the circuit 104), and inputs the characteristic amount data to the memory 110 in order of serial numbers associated with the dictionary data. At Step S4, the memory 110 outputs characteristic amount data for one dictionary character in order of the serial numbers. The memories 111-1 to 111-k simultaneously output characteristic amount data for input one unknown character.

Step S5 is the same as that in the first embodiment. When the judgment result at Step S5 is affirmative, as in the first embodiment, the distance calculating circuits 112-1 to 112-k output distances between one unknown character and one dictionary character. At this point, the counter 130 increases and outputs a counter value (a serial number) of characteristic amount data for one dictionary character output from the memory 110. The serial number is input to the selecting circuits 113-1 to 113-k. The selecting circuits 113-i judge whether input distances correspond to minimum ten distances and store the minimum ten distances and serial numbers corresponding to the distances. At Steps S6 to S10, processing is performed by using the serial numbers instead of the character codes in the first embodiment. As a result, ten distances and serial numbers corresponding to the distances are stored in the RAM 3 as recognition candidate data for all the unknown characters.

With the configuration described above, because character data does not have to be included in dictionary data used for the matching processing, it is possible to reduce a data amount of the dictionary data. Therefore, it is possible to reduce memory consumption of the RAM 3 that stores the dictionary data. Because it is unnecessary to transfer the character codes from the RAM 3 to the LSI 5, it is possible to reduce time for data transfer to the LSI 5. In the circuit 104 configured in the LSI 5, the counter 130 only has to be provided instead of the character code memory 109. Therefore, it is possible to save memory resources in the LSI 5 and further reduce a circuit size.

Figure 26:
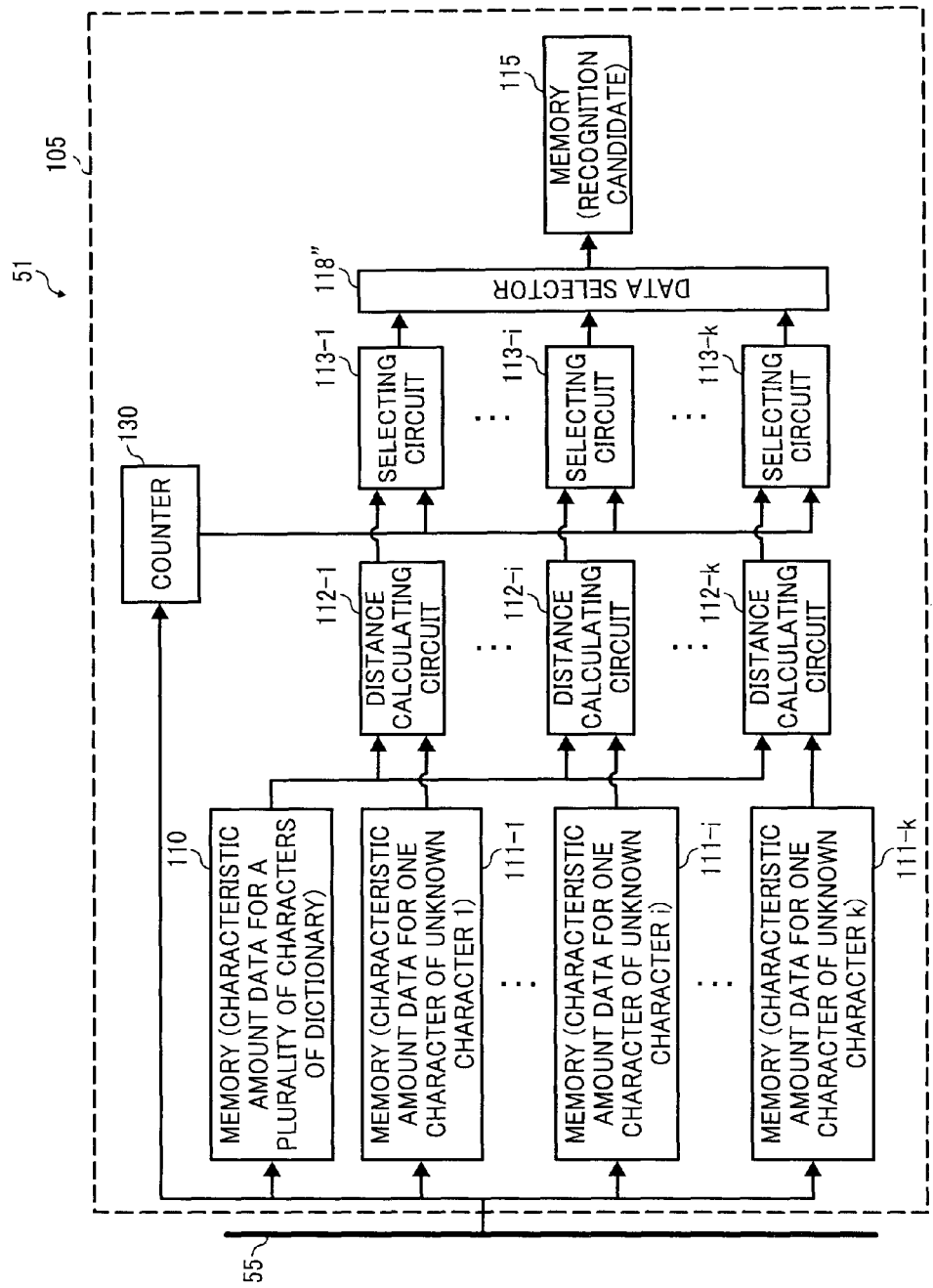
FIG. 26 is a diagram of a circuit configured in the circuit unit 51 of the LSI 5 according to a modification.

In a modification of the second embodiment, as in the embodiment, serial numbers of characteristic amount data for dictionary characters can be used instead of character codes. FIG. 26 is a diagram of a configuration of a circuit configured in the circuit unit 51 of the LSI 5 according to this modification. In this modification, a circuit 105 shown in FIG. 26 is configured in the circuit unit 51 instead of the circuit 102 in the second embodiment. The circuit 105 includes the counter 130 instead of the character code memory 109.

A flowchart of a procedure of matching processing in such a configuration is substantially the same as that shown in FIG. 25. Therefore, the flowchart is not shown as a figure. Differences from the embodiments described above are explained. At Step S1', the CPU 50 of the LSI 5 configures the circuit 105 shown in FIG. 26 in the circuit unit 51. Step S2 is the same as that in the embodiments. Step S3' is the same as that in the third embodiment. Steps S4 and S5 are the same as those in the first embodiment. Steps S5 to S7 are the same as those in the embodiments. At Step S8, as in the second embodiment, the CPU 50 configures the circuit 103 shown in FIG. 23 in the circuit unit 51 while keeping the recognition candidate data stored in the memory 115. Steps S9 and S10 are also the same as those in the second embodiment. As a result, ten distances and serial numbers corresponding to the distances are stored in the RAM 3 as recognition candidate data for all the unknown characters.

With such a configuration, compared with the first and second embodiments, it is possible to reduce memory consumption of the RAM 3 and further reduce a circuit size. It is also possible to reduce time for data transfer to the LSI 5.

The present invention is not limited to the embodiments per se. At an implementation stage, the elements of the embodiments can be modified and embodied without departing from the spirit of the present invention. Various inventions can be formed by appropriate combinations of the elements disclosed in the embodiments. For example, several elements can be deleted from all the elements described in the embodiments. Moreover, the elements described in the different embodiments can be appropriately combined.

In the embodiments described above, the number (P) of recognition candidate data for an unknown character is set to ten. However, the number of recognition candidate data is not limited to this number.

In the first and second embodiments, the character codes and the characteristic amount data included in the dictionary data for L dictionary characters among the dictionary data for all the dictionary characters stored in the RAM 3 are input to the character code memory 109 and the memory 110. However, character codes and characteristic amount data included in the dictionary data for all the dictionary characters stored in the RAM 3 can be input to the character code memory 109 and the memory 110.

According to the present invention, when matching of an unknown character and dictionary characters is performed by parallel processing in character recognition, it is possible to reduce a size of a circuit of an LSI and reduce cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A matching device that selects, in character recognition, using a characteristic amount of a first character as a recognition object and characteristic amounts of a plurality of second characters registered in a dictionary in advance, P second characters similar to the first character among the second characters as recognition candidates, where P is an integer equal to or larger than two, the matching device comprising:

a first storing unit that stores a plurality of first characteristic amount data indicating the characteristic amount of the first character and a plurality of dictionary data including second characteristic amount data indicating the characteristic amounts of the second characters and character codes of the second characters;

a semiconductor device including a circuit unit in which a circuit is rewritably configured and a second circuit is configured after a first circuit is configured and a control unit that controls rewriting of the circuit configured in the circuit unit; and a second storing unit that stores first circuit configuration data for configuring the first circuit in the circuit unit and second circuit configuration data for configuring the second circuit in the circuit unit, wherein the first circuit includes k first memories that are respectively input with k first characteristic amount data among the first characteristic amount data stored in the first storing unit, where k is an integer equal to or larger than two, a character code memory that is input with the character codes included in L dictionary data among the dictionary data stored in the first storing unit, where L is an integer equal to or larger than two, a second memory that is input with the second characteristic amount data included in the L dictionary data among the dictionary data stored in the first storing unit, k distance calculating units that are input with the first characteristic amount data input to one of the first memories and the second characteristic amount data input to the second memory and calculate, for each of the second characters, a distance between the first character and the second character using the first characteristic amount data and the second characteristic amount data, the distance calculating units being capable of operating in parallel to one another, k selecting units that are input with the character codes corresponding to the second characteristic amount data used by one of the distance calculating units for the calculation of a plurality of the distances from the character code memory and are input with the distances calculated by one of the distance calculating units and select P first distances with a smallest value among the distances and first character codes corresponding to the respective first distances, the selecting units being capable of operating in parallel to one another, and k third memories that are respectively input with the P first distances and the first character codes selected by one of the selecting units and store the first distances and the first character codes, the second circuit includes the k third memories, and k permutation units that are input with the L first distances and the first character codes stored in one of the third memories and output the first distances in order from one having a smallest value and output the first character codes corresponding to the first distances, the permutation units being capable of operating in parallel to one another, and the control unit reads out the first circuit configuration data stored in the second storing unit and configures the first circuit in the circuit unit and, then, when the P first distances and the first character codes are respectively input to the k third memories of the first circuit, reads out the second circuit configuration data stored in the second storing unit and rewrites the circuit configured in the circuit unit to the second circuit while keeping the P first distances and the first character codes in the k third memories, respectively.

2. The matching device according to claim 1, wherein each of the selecting units includes P distance registers that each stores one of the first distances, P character code registers that each stores the first character code corresponding to one of the first distances, (P−1) first comparing units that are input with the first distances respectively stored in two distance registers among the P distance registers and compare magnitude of the two first distances, a maximum detecting unit that detects, based on results of the comparison by the first comparing units, a maximum of the distances respectively stored in the P distance registers, a second comparing unit that compares a second distance input to the selecting unit anew and the maximum detected by the maximum detecting unit, and a writing control unit that inputs, when the second distance is smaller than the maximum as a result of the comparison by the second comparing unit, the second distance to a first distance register in which the maximum is stored, rewrites a value of a first distance stored in the first distance register to a value of the second distance, inputs a third character code corresponding to the second distance to a first character code register that stores the character code corresponding to the maximum, and rewrites a value of a first character code stored in the first character code register to a value of the second character code.

3. The matching device according to claim 1, wherein each of the permutation units includes P×(P−1)÷2 third comparing units that are respectively inputs with two first distances among the P first distances selected by the selecting units and correspond to all combinations of the two first distances among the P first distances, a rank determining unit that determines, based on comparison results of the third comparing units, ranks of smallness of values for the P first distances and outputs the determined ranks, a first output unit that is input with the P first distances and the ranks output by the rank determining unit in association with the P first distances, respectively, and outputs the first distances corresponding to the ranks in order from one having a smallest value of the ranks, and a second output unit that is inputted with the P first character codes corresponding to the P first distances, respectively, and the ranks output by the rank determining unit in association with the P first distances, respectively, and outputs the first character codes in order from one having a smallest value of the ranks of the first distances corresponding to the first character codes, respectively.

4. The matching device according to claim 1, wherein the control unit causes the first storing unit to store, as recognition candidate data, the first distances and the first character codes output by the permutation units.

5. The matching device according to claim 1, wherein at least one of the first storing unit and the second storing unit is a random access memory.

6. A matching device that selects, in character recognition, using a characteristic amount of a first character as a recognition object and characteristic amounts of a plurality of second characters registered in a dictionary in advance, P second characters similar to the first character among the second characters as recognition candidates, where P is an integer equal to or larger than two, the matching device comprising:

a first storing unit that stores a plurality of first characteristic amount data indicating the characteristic amount of the first character and a plurality of dictionary data including second characteristic amount data indicating the characteristic amounts of the second characters and character codes of the second characters;

a semiconductor device including a circuit unit in which a circuit is rewritably configured and a second circuit is configured after a first circuit is configured and a control unit that controls rewriting of the circuit configured in the circuit unit; and a second storing unit that stores first circuit configuration data for configuring the first circuit in the circuit unit and second circuit configuration data for configuring the second circuit in the circuit unit, wherein the first circuit includes k first memories that are respectively input with k first characteristic amount data among the first characteristic amount data stored in the first storing unit where k is an integer equal to or larger than two, a character code memory that is input with the character codes included in L dictionary data among the dictionary data stored in the first storing unit, where L is an integer equal to or larger than two, a second memory that is input with the second characteristic amount data included in the L dictionary data among the dictionary data stored in the first storing unit, k distance calculating units that are input with the first characteristic amount data input to one of the first memories and the second characteristic amount data input to the second memory and calculate, for each of the second characters, a distance between the first character and the second character using the first characteristic amount data and the second characteristic amount data, the distance calculating units being capable of operating in parallel to one another, k selecting units that are input with the character codes corresponding to the second characteristic amount data used by one of the distance calculating units for the calculation of a plurality of the distances from the character code memory and are input with the distances calculated by one of the distance calculating units and select P first distances with a smallest value among the distances and first character codes corresponding to the respective first distances, the selecting units being capable of operating in parallel to one another, and a third memory that is input with the P first distances and the first character codes selected by the k selecting units in order and stores k sets of the P first distances and the first character codes, the second circuit includes the k third memory, and a permutation unit that is input with the k sets of the P first distances and the first character codes stored in the third memory and outputs, for each of the sets, the first distances in order from one having a smallest value and outputs the first character codes corresponding to the first distances, and the control unit reads out the first circuit configuration data stored in the second storing unit and configures the first circuit in the circuit unit and, then, when the k sets of the P first distances and the first character codes are input to the third memory of the first circuit, reads out the second circuit configuration data stored in the second storing unit and rewrites the circuit configured in the circuit unit to the second circuit while keeping the k sets of the P first distances and the first character codes in the third memory.

7. The matching device according to claim 6, wherein each of the selecting units includes P distance registers that each stores one of the first distances, P character code registers that each stores the first character code corresponding to one of the first distances, (P−1) first comparing units that are input with the first distances respectively stored in two distance registers among the P distance registers and compare magnitude of the two first distances, a maximum detecting unit that detects, based on results of the comparison by the first comparing units, a maximum of the distances respectively stored in the P distance registers, a second comparing unit that compares a second distance input to the selecting unit anew and the maximum detected by the maximum detecting unit, and a writing control unit that inputs, when the second distance is smaller than the maximum as a result of the comparison by the second comparing unit, the second distance to a first distance register in which the maximum is stored, rewrites a value of a first distance stored in the first distance register to a value of the second distance, inputs a third character code corresponding to the second distance to a first character code register that stores the character code corresponding to the maximum, and rewrites a value of a first character code stored in the first character code register to a value of the second character code.

8. The matching device according to claim 6, wherein each of the permutation units includes P×(P−1)÷2 third comparing units that are respectively inputs with two first distances among the P first distances selected by the selecting units and correspond to all combinations of the two first distances among the P first distances, a rank determining unit that determines, based on comparison results of the third comparing units, ranks of smallness of values for the P first distances and outputs the determined ranks, a first output unit that is input with the P first distances and the ranks output by the rank determining unit in association with the P first distances, respectively, and outputs the first distances corresponding to the ranks in order from one having a smallest value of the ranks, and a second output unit that is inputted with the P first character codes corresponding to the P first distances, respectively, and the ranks output by the rank determining unit in association with the P first distances, respectively, and outputs the first character codes in order from one having a smallest value of the ranks of the first distances corresponding to the first character codes, respectively.

9. The matching device according to claim 6, wherein the control unit causes the first storing unit to store, as recognition candidate data, the first distances and the first character codes output by the permutation units.

10. The matching device according to claim 6, wherein at least one of the first storing unit and the second storing unit is a random access memory.

* * * * *